US011291331B2

(12) United States Patent
Xu et al.

(10) Patent No.: US 11,291,331 B2
(45) Date of Patent: Apr. 5, 2022

(54) COOKING FUME TREATMENT SYSTEM FOR COOKING MACHINES AND COOKING MACHINE

(71) Applicant: SHANGHAI AICAN ROBOT (GROUP) CO., LTD., Shanghai (CN)

(72) Inventors: Jinbiao Xu, Shanghai (CN); Guang He, Shanghai (CN); Qing He, Shanghai (CN); Luoya Zeng, Shanghai (CN)

(73) Assignee: SHANGHAI AICAN ROBOT (GROUP) CO., LTD., Shanghai (CN)

( * ) Notice: Subject to any disclaimer, the term of this patent is extended or adjusted under 35 U.S.C. 154(b) by 58 days.

(21) Appl. No.: 16/862,558

(22) Filed: Apr. 29, 2020

(65) Prior Publication Data
US 2020/0253417 A1    Aug. 13, 2020

Related U.S. Application Data

(63) Continuation of application No. PCT/CN2018/113948, filed on Nov. 5, 2018.

(30) Foreign Application Priority Data

Nov. 3, 2017  (CN) .......................... 201711068249.6
Nov. 3, 2017  (CN) .......................... 201711068276.3
(Continued)

(51) Int. Cl.
*B01D 47/00*     (2006.01)
*B01D 36/02*     (2006.01)
(Continued)

(52) U.S. Cl.
CPC .............. *A47J 36/38* (2013.01); *B01D 29/50* (2013.01); *B01D 36/02* (2013.01); *B01D 47/05* (2013.01);
(Continued)

(58) Field of Classification Search
CPC ......... F24C 15/30; B01D 29/50; B01D 36/02; B01D 47/05; B01D 47/06; B01D 50/006; A47J 36/38
See application file for complete search history.

(56) References Cited

U.S. PATENT DOCUMENTS 7,588,025 B2 *  9/2009  Raus ................... F24C 15/2014
                                                    110/203

FOREIGN PATENT DOCUMENTS

CN        2328415 Y    7/1999
CN        2340492 Y    9/1999
(Continued)

OTHER PUBLICATIONS

International Search Report of PCT Patent Application No. PCT/CN2018/113948 dated Jan. 30, 2019.

*Primary Examiner* — Robert A Hopkins

(57) ABSTRACT

A cooking fume treatment system for cooking machines comprises a sealed cooking cavity (A100), cooking equipment (A101) and a first cooking fume treatment device (A200), the cooking equipment (A101) is arranged in the sealed cooking cavity (A100); the first cooking fume treatment device (A200) is provided with a first fume inlet (A201) and a first fume outlet (A202), the first fume inlet (A201) is communicated with the cooking equipment (A101), and the first fume outlet (A202) is communicated with the external of the sealed cooking cavity (A100). By arranging the sealed cooking cavity (A100), cooking fume generated by the cooking machine is sealed in the sealed cooking cavity, and the cooking fume can be discharged into the environment only after being treated by the first cooking fume treatment device (A200), so that the influence of the cooking fume of the cooking machine on the environment is reduced.

19 Claims, 19 Drawing Sheets

(30) Foreign Application Priority Data

| Nov. 3, 2017 | (CN) | 201711069228.6 |
|---|---|---|
| Nov. 3, 2017 | (CN) | 201711076242.9 |
| Nov. 3, 2017 | (CN) | 201711081136.X |
| Nov. 3, 2017 | (CN) | 201711081145.9 |
| Nov. 3, 2017 | (CN) | 201711081495.5 |
| Nov. 3, 2017 | (CN) | 201721459045.0 |

(51) Int. Cl.
    *B01D 50/00*      (2006.01)
    *A47J 36/38*      (2006.01)
    *B01D 47/05*      (2006.01)
    *B01D 47/06*      (2006.01)
    *F24C 15/20*      (2006.01)
    *B01D 29/50*      (2006.01)

(52) U.S. Cl.
    CPC ........... *B01D 47/06* (2013.01); *B01D 50/006* (2013.01); *F24C 15/2035* (2013.01)

(56) References Cited

FOREIGN PATENT DOCUMENTS

| CN | 2577156 Y | 10/2003 |
|---|---|---|
| CN | 2579504 Y | 10/2003 |
| CN | 2651628 Y | 10/2004 |
| CN | 2692541 Y | 4/2005 |
| CN | 201348300 Y | 11/2009 |
| CN | 101718448 A | 6/2010 |
| CN | 103126515 A | 6/2013 |
| CN | 203168901 U | 9/2013 |
| CN | 203576262 U | 5/2014 |
| CN | 104019480 A | 9/2014 |
| CN | 204853622 U | 12/2015 |
| CN | 105433759 A | 3/2016 |
| CN | 105662107 A | 6/2016 |
| CN | 105686016 A | 6/2016 |
| CN | 205650017 U | 10/2016 |
| CN | 106166026 A | 11/2016 |
| CN | 206152542 U | 5/2017 |
| CN | 206563397 U | 10/2017 |

\* cited by examiner

COOKING FUME TREATMENT SYSTEM FOR COOKING MACHINES AND COOKING MACHINE

CROSS REFERENCE TO RELATED APPLICATIONS

The present application is a Continuation Application of PCT Application No. PCT/CN2018/113948 filed on Nov. 5, 2018, which claims the benefit of Chinese Patent Application Nos. 201711081145.9, 201711081495.5, 201721459045.0, 201711081136.X, 201711069228.6, 201711068276.3, 201711068249.6 and 201711076242.9 filed on Nov. 3, 2017. All the above are hereby incorporated by reference.

FIELD OF THE INVENTION

The invention relates to the technical field of intelligent manufacturing and intelligent service, in particular to a cooking fume treatment system for cooking machines and a cooking machine.

BACKGROUND OF THE INVENTION

With the development of intelligent technology, nowadays, the society is rapidly going into an intelligent era. However, in traditional kitchen equipment, besides an electric cooker, an electric pressure cooker, an induction cooker and the like, automation can be achieved, some equipment needs to be manually operated by a user, such as a cooking machine, the equipment cannot meet the intelligent requirement, and people need to spend time on the cooking procedure. Under the driving of automation requirements, some cooking machines with automatic cooking functions appear on the market, and the cooking machines have the trend of wide application. For the design of a cooking machine, cooking fume treatment is always a difficult problem. In the cooking process of the cooking machine, the problem of cooking fume pollution also causes troubles to users.

In particular, existing cooking machines are ubiquitous for these problems:

1. due to the lack of a cooking fume treatment system, the cleaning is very troublesome, once cooking fume enters a crack of a machine, the cooking fume is not easy to clean, bacteria are easy to breed, and the health of a user is influenced;

2. the service life of the machine is influenced because the cooking fume is not discharged in time;

3. the cooking fume is not thoroughly treated, so that a large amount of cooking fume is still discharged into the air after treatment, and the surrounding environment is polluted; and 4. special cooking fume treatment equipment is high in manufacturing cost and high in cost.

SUMMARY OF THE INVENTION

The embodiment of the invention aims to provide a cooking fume treatment system for cooking machines and a cooking machine, which can effectively solve the problems of incomplete cooking fume treatment and cooking fume pollution of the existing cooking machine.

In order to achieve the above goal, the embodiment of the invention provides a cooking fume treatment system for cooking machines which comprises a sealed cooking cavity, cooking equipment and a first cooking fume treatment device; the cooking equipment is arranged in the sealed cooking cavity; the first cooking fume treatment device is provided with a first cooking fume inlet and a first cooking fume outlet, the first cooking fume inlet is communicated with the cooking equipment, and the first cooking fume outlet is communicated to the external of the sealed cooking cavity.

Compared with the prior art, the cooking fume treatment system for cooking machines is provided with the sealed cooking cavity, so that cooking fume generated by the cooking equipment of the cooking machine is sealed in the sealed cooking cavity and can be discharged into the environment only after being treated by the first cooking fume treatment device, so that the influence of the cooking machine cooking fume on the environment is reduced.

Preferably, the first cooking fume treatment device further comprises a second cooking fume inlet, and the second cooking fume inlet is communicated with the sealed cooking cavity. The second cooking fume inlet communicated with the sealed cooking cavity is formed in the first cooking fume treatment device, so that the cooking fume escaping into the sealed cooking cavity from the cooking equipment is purified by the first cooking fume treatment device and then discharged, and the pollution of the cooking fume of the cooking machine to the environment is reduced.

Preferably, the cooking fume treatment system further comprises a second cooking fume treatment device, a third cooking fume inlet and a second cooking fume outlet are formed in the second cooking fume treatment device, the third cooking fume inlet communicates with the sealed cooking cavity, and the second cooking fume outlet communicates with the external of the sealed cooking cavity. Due to the arrangement of the second cooking fume treatment device, cooking fume escaping into the sealed cooking cavity from the cooking equipment is discharged into the environment after being purified, and pollution of cooking fume of the cooking machine to the environment is reduced.

Another embodiment of the invention provides a cooking fume treatment system for cooking machines which comprises a sealed cooking cavity, cooking equipment and a first cooking fume treatment device; the cooking equipment is arranged in the sealed cooking cavity; the first cooking fume treatment device is provided with a first cooking fume inlet and a first cooking fume outlet, the first cooking fume inlet is communicated with the cooking equipment, and the first cooking fume outlet is communicated with the sealed cooking cavity.

Compared with the prior art, the cooking fume treatment system for cooking machines has the advantages that the first cooking fume outlet of the first cooking fume treatment device is communicated with the sealed cooking cavity, so that cooking fume generated by the cooking machine is circularly treated without being discharged into the environment, and the cooking fume is effectively prevented from polluting the environment.

Preferably, the first cooking fume treatment device is further provided with a second cooking fume inlet, and the second cooking fume inlet is communicated with the sealed cooking cavity. The second cooking fume inlet communicated with the sealed cooking cavity is formed in the first cooking fume treatment device, so that the cooking fume in the sealed cooking cavity and the cooking fume passing through the first cooking fume treatment device circularly enter the first cooking fume treatment device again to be treated, and circulation is performed in this way; the cooking fume generated by the cooking machine will not be discharged into the environment, most of the cooking fume circularly treated by the first cooking fume treatment device is converted into liquid to be discharged out of the sealed cooking cavity, and the cooking fume of the cooking machine can be prevented from polluting the environment.

Preferably, the cooking fume treatment system further comprises a second cooking fume treatment device, a third cooking fume inlet and a second cooking fume outlet are formed in the second cooking fume treatment device, the third cooking fume inlet communicates with the sealed cooking cavity, and the second cooking fume outlet communicates with the external of the sealed cooking cavity.

Preferably, the cooking equipment comprises a wok and a wok lid adapted for closing or opening the wok; the wok lid is provided with an air outlet hole, and the first cooking fume inlet is connected with the air outlet hole in a sealed manner so as to be communicated with the cooking equipment.

Preferably, the cooking equipment further comprises a wok heating device adapted for bearing and heating the wok and a wok rotating device adapted for controlling the wok to rotate.

Preferably, the first cooking fume inlet is in sealed connection with the air outlet through a cooking fume pipeline.

Preferably, the first cooking fume treatment device comprises a fume guiding pipe, a condensing pipe, a condensate collector and a pipeline fan; an air inlet end of the fume guiding pipe is communicated with the air outlet hole of the wok lid, an air outlet end of the fume guiding pipe is communicated with the pipeline fan through the condensing pipe, and the pipeline fan is arranged at the first cooking fume outlet; pipe sections of the condensing pipe are extended in vertical direction, and the condensate collector is arranged below the condensing pipe and communicated with a lowest part of the condensing pipe.

Preferably, the second cooking fume treatment device comprises a cooking fume filter and a fan; an air inlet of the fan is provided as the third cooking fume inlet to be communicated with the cooking area, an air outlet of the fan is communicated with an air inlet of the cooking fume filter, and an air outlet of the cooking fume filter is provided as the second cooking fume outlet.

Preferably, the first cooking fume treatment device comprises:

a box body provided with a cooking fume channel formed therein, and an inlet and an outlet of the cooking fume channel are communicated with the first cooking fume inlet and the first cooking fume outlet respectively;

a fan adapted for sucking cooking fume into the box body from the inlet of the cooking fume channel and exhausting the cooking fume out from the outlet of the cooking fume channel; and a cooking fume filtering assembly arranged in the cooking fume channel.

Preferably, the box body is further provided with a water adding opening, and the first cooking fume treatment device further comprises:

a water circulating pipeline provided with at least one first water outlet which is formed in a top portion of the box body and located above the cooking fume channel and at least one first water inlet which is formed in a lower portion of the box body; and a water pump arranged in the water circulating pipeline.

Preferably, the first cooking fume treatment device further comprises a spraying plate provided with a plurality of spraying holes, the spraying plate is arranged between and separate the cooking fume channel and the top portion of the box body, and the at least one first water outlet is located above the spraying plate; water sprayed from each first water outlet falls onto the spraying plate and then passes through the plurality of spraying holes of the spraying plate to spray the cooking fume channel.

Preferably, the first cooking fume treatment device further comprises a cooling body of a hollow structure, the cooling body is provided with a second water inlet which is communicated with a water outlet pipe section of the water circulating pipeline and a second water outlet which is located above the spraying plate; water in the water outlet pipe section of the water circulating pipeline flows into the cooling body from the second water inlet to be cooled, then is sprayed onto the spraying partition plate from the second water outlet, and then is sprayed to the cooking fume channel from the plurality of spraying holes of the spraying plate.

Preferably, the first cooking fume treatment device further comprises a miniature refrigerator provided with a refrigeration part arranged in the cooking fume channel; the cooling body is in contact with a heat conduction part of the miniature refrigerator, cold water flowing into the cooling body takes away heat of the heat conduction part; a heat dissipation opening is formed in the top portion of the box body, a containing cavity communicated with the heat dissipation opening is formed above the spraying plate, and the heat conduction part of the miniature refrigerator and the cooling body are both arranged in the containing cavity; heat generated by the heat conduction part of the miniature refrigerator is discharged out from the heat dissipation opening.

Preferably, the first cooking fume treatment device further comprises a cooking fume inlet pipe and a spraying cavity with an opening in a top portion thereof;

the top portion of the spraying cavity is fixed to a bottom portion of the part, provided with the spraying holes, of the spraying plate, and a bottom portion of the spraying cavity is located above a bottom portion of the box body and provided with a through opening;

one end of the cooking fume inlet pipe penetrates through the inlet of the cooking fume channel in a sealed manner in the direction towards the interior of the box body and penetrates into the spraying cavity in a sealed manner; in the spraying cavity, an extended cooking fume spraying channel is formed between one end of the cooking fume inlet pipe and the through hole; at least one cooking fume filtering layer is arranged in the cooking fume spraying channel, and a bottom portion of each section of the cooking fume spraying channel communicates with the through opening.

Preferably, the miniature refrigerator is a semiconductor refrigerator, and a plurality of refrigeration pieces of the miniature refrigerator are arranged in the spraying cavity and distributed above the cooking fume spraying channel.

Preferably, the first cooking fume treatment device further comprises:

a first longitudinal partition plate longitudinally arranged between the spraying plate and the bottom portion of the box body, and a cooking fume channel opening is formed between a bottom portion of the first longitudinal partition plate and the bottom in the box body;

a transverse partition plate located between the spraying plate and the bottom portion of the box body and transversely arranged between the first longitudinal partition plate and a side wall, opposite to the first longitudinal partition plate, of the box body;

a second longitudinal partition plate longitudinally arranged between the first longitudinal partition plate and the side wall of the box body, a top portion of the second longitudinal partition plate is in sealed connection with the bottom portion of the spraying plate, and a bottom portion of the second longitudinal partition plate is spaced from a top portion of the transverse partition plate; and a third longitudinal partition plate longitudinally arranged between the second longitudinal partition plate and the side wall of the box body, a top portion of the third longitudinal partition plate is spaced from the bottom portion of the spraying plate, a bottom portion of the third longitudinal partition plate is fixed to the top portion of the transverse partition plate, and a gap is formed between the bottom portion of the third longitudinal partition plate and the transverse partition plate;

the other end of the cooking fume inlet pipe is located between the first longitudinal partition plate and the second longitudinal partition plate; the through opening is formed in the transverse partition plate and located between the third longitudinal partition plate and the side wall of the box body; the outlet of the cooking fume channel is formed in the other side wall, opposite to the side wall, of the box body and located below the spraying plate.

Preferably, the first cooking fume treatment device further comprises a first filtering box provided with a cooking fume inlet and a cooking fume outlet, and at least one cooking fume filter layer is arranged between the cooking fume inlet and the cooking fume outlet; the outlet of the cooking fume channel is communicated with the first cooking fume outlet through the first filtering box, the outlet of the cooking fume channel is communicated with the cooking fume inlet of the first filtering box, and the cooking fume outlet of the first filtering box is communicated with the first cooking fume outlet.

Preferably, the box body is provided with a water adding opening formed in the top portion thereof and a water draining opening formed in the bottom portion thereof; water is added into the box body from the water adding opening to spray the cooking fume filtering assembly in the cooking fume channel to cool and clean the cooking fume filtering assembly; and water which is added into the box body and sprays the cooking fume filtering assembly is discharged from the water draining opening of the box body.

Preferably, the first cooking fume treatment device further comprises a draining pipe; the first filtering box is located below the box body; the cooking fume inlet is formed in the top portion of the first filtering box, and the cooking fume outlet is formed in the bottom portion of the first filtering box; one end of the draining pipe is connected with the top portion of the first filtering box, and the other end of the draining pipe penetrates into and protrudes relative to the bottom portion of the box body; when the water level at the bottom portion of the box body is higher than a preset height of the other end of the draining pipe, the water in the box body flows down into the first filtering box through the draining pipe, and sequentially passes through each cooking fume filter layer in the first filtering box from top to bottom to cool and/or clean each cooking fume filter layer, the water flowing into the first filtering box is discharged from the cooking fume outlet formed in the bottom portion of the first filtering box.

Preferably, the first cooking fume treatment device further comprises a cooking fume outlet pipe and a second filtering box; the outlet of the cooking fume channel is communicated with the cooking fume inlet of the first filtering box via the second filtering box, an inlet of the second filtering box is communicated with the outlet of the cooking fume channel via the fan, and an outlet of the second filtering box is communicated with the cooking fume inlet of the first filtering box via the cooking fume outlet pipe; and at least one cooking fume filtering layer is arranged in the second filtering box.

Preferably, a feeding area for containing an ingredient feeding device, a cooking area for containing cooking equipment and a dish discharging area for containing a dish discharging device are sequentially arranged in the sealed cooking cavity from top to bottom.

Preferably, the sealed cooking cavity is mainly formed by assembling an inner shell and an outer shell; the inner shell is fixedly installed in the outer shell, a cooking fume treatment area is formed between the inner shell and the outer shell, and the cooking fume treatment area is adapted for containing the first cooking fume treatment device and the second cooking fume treatment device.

Preferably, a cooking fume outlet is formed in a side wall, opposite to the cooking area, of the inner shell, the wok lid is tightly attached to the inner part of the side wall, provided with the cooking fume outlet, of the inner shell, and an air outlet hole in the wok lid communicates with the cooking fume outlet in a sealed manner.

Preferably, a top cover door plate capable of being opened and closed is arranged at a top portion of the outer shell, a middle door plate is arranged at a middle portion of a front face of the outer shell, and a seasoning door plate capable of being opened and closed is arranged at a lower portion of the front face of the outer shell; and an installing panel for installing a human-computer interface is arranged at an upper portion of the front surface of the outer shell.

Preferably, the middle door plate and the seasoning door plate are integrally formed.

Preferably, a feeding device flushing spraying head is arranged on an end face, facing the inner shell, of the top cover door plate and adapted for cleaning an ingredient feeding device installed in the inner shell.

Preferably, a top cover opening adapted for installing the top cover door plate is formed in a top portion of the inner shell; an installing opening for installing the middle door plate is formed in a side wall, opposite to the cooking fume outlet, of the inner shell; first installing positions are respectively arranged in middle portions of two opposite side walls, adjacent to the installing opening, of the inner shell and are adapted for installing the wok working position controlling mechanism in the cooking area; second installing positions are respectively arranged in upper parts of two opposite side walls, adjacent to the installing opening, of the inner shell and are adapted for installing the ingredient feeding device in the feeding area; and a dish discharging area draining outlet is formed in a bottom portion of the inner shell.

Preferably, sealing strips are arranged on the edges of the top cover opening and the installing opening.

Preferably, the first installing position is an installing groove, an installing frame or an installing plate; and the second installing position is an installing groove, an installing frame or an installing plate.

Preferably, a third installing position adapted for installing a human-computer interface installing device is arranged on the side wall of the inner shell and located above the installing opening, and the second installing position is an installing groove or an installing plate.

Preferably, a draining channel structure is further arranged at the bottom portion of the inner shell; the draining channel structure is of a hollow structure, a sewage collecting opening is formed in a upper end of the draining channel structure, and a draining opening is formed in a bottom end of the draining channel structure.

Preferably, the draining channel structure is of a funnel-shaped structure.

Preferably, the cooking fume treatment area is located outside a side wall, provided with the cooking fume inlet, of the inner shell.

Preferably, a seasoning adding area adapted for containing a seasoning device is further formed between the inner shell and the outer shell, and the seasoning adding area is located below the bottom portion of the inner shell.

Another embodiment of the invention provides a cooking machine. The cooking machine comprises the cooking fume treatment system for cooking machines in any embodiment.

Further, the sealed cooking cavity is formed by assembling an inner shell and an outer shell, the inner shell is fixedly installed in the outer shell, a cooking fume treatment area and a seasoning adding area are formed between the inner shell and the outer shell, the cooking fume treatment area is located on the rear wall of the inner shell, and the seasoning adding area is located on the rear wall of the outer shell. And the seasoning adding area is positioned below the inner shell.

Preferably, the sealed cooking cavity is formed by assembling an inner shell and an outer shell, the inner shell is fixedly installed in the outer shell, a cooking fume treatment area and a seasoning adding area are formed between the inner shell and the outer shell, the cooking fume treatment area is located on a rear wall of the inner shell, and the seasoning adding area is located below the inner shell.

Preferably, the cooking machine further comprises an ingredient feeding device, cooking equipment, a dish discharging device, auxiliary cooking equipment and a control device; the ingredient feeding device, the cooking equipment and the dish discharging device are arranged in the sealed cooking cavity, and the auxiliary cooking equipment and the control device are arranged between the outer shell and the inner shell and adapted for assisting in achieving cooking; the cooking equipment comprises a wok lid, a wok, a wok rotating mechanism, a wok working position controlling device and a wok heating device, the wok rotating mechanism is adapted for controlling the wok to rotate, the wok working position controlling device is adapted for driving the wok to turn, and the wok heating device is adapted for heating the wok.

Preferably, the auxiliary cooking equipment comprises a wok lifting device, a wok working position conversion motor, a wok working position detection device, a feeding device working position conversion motor and a feeding device working position detection device; the wok lifting device, the wok working position conversion motor and the wok working position detection device are arranged on the two side walls, opposite to the cooking area, of the inner shell and cooperated with the cooking equipment; the feeding device working position conversion motor and the discharging device working position detection device are arranged on the two side walls, opposite to the feeding area, of the inner shell respectively and installed on the feeding device in a matched manner.

Preferably, the auxiliary cooking equipment further comprises a seasoning device, and the seasoning device is arranged below the bottom portion of the inner shell and is far away from the sewage collecting opening of the inner shell so as to provide seasonings for the cooking equipment.

Preferably, the seasoning device comprises a plurality of seasoning bottles, a seasoning pipe and a seasoning pump, each seasoning bottle is communicated with a seasoning adding opening of the wok lid through the seasoning pipe, and the seasoning pump is arranged in the seasoning pipe so that seasonings in the seasoning bottles can be pumped into the wok.

Preferably, the auxiliary cooking equipment further comprises a garbage processor, and the garbage processor is arranged below the inner shell and connected with a sewage collecting opening in the bottom portion of the inner shell in a sealed manner.

Preferably, the auxiliary cooking equipment further comprises an electric appliance, a circuit, a power supply, a transmission line and a pipeline component.

Preferably, the first cooking fume treatment device or the second cooking fume treatment device is arranged in a space formed by the inner shell and the outer shell and located on the rear wall of the inner shell.

Preferably, the cooking machine further comprises a left rack and a right rack, and the inner shell is fixedly installed in the outer shell through the left rack and the right rack.

Compared with the prior art, the cooking machine has the advantages that the outer shell and the inner shell are assembled, so that the space formed by the inner shell forms the sealed cooking cavity, and the ingredient feeding device, the cooking equipment and the dish discharging device are arranged in the sealed cooking cavity; auxiliary cooking equipment (such as a wok lifting device, a wok working position conversion motor, a wok working position detection device, a feeding device working position conversion motor, a feeding device working position detection device, an electric part, a circuit, a power supply, a transmission line and a pipeline) and a cooking fume treatment device are arranged outside the sealed cooking cavity; therefore, cooking fume generated by the cooking equipment can be discharged into the environment only after being discharged into the cooking fume treatment device through the cooking fume outlet in the inner shell to be treated, and the influence of cooking fume of the cooking machine on the environment is effectively prevented; besides, the auxiliary cooking equipment can be effectively prevented from being affected by the high-temperature, high-humidity and high-pH environment of the cooking area of the cooking machine, it is guaranteed that the ingredient feeding device, the cooking equipment, the seasoning device and the like work durably and effectively, and the safety of cooked food is guaranteed.

DETAILED DESCRIPTION OF ILLUSTRATED EMBODIMENTS

Technical solutions in embodiments of the present invention will be described clearly and fully hereinafter in conjunction with the accompanying drawings in embodiments of the present invention, and obviously, the described embodiments are only a part of, and not all, embodiments of the present invention. Based on the embodiments of the invention, all other embodiments obtained by one of ordinary skill in the art without creative work fall within the scope of the invention.

The embodiment of the present invention provides a cooking fume treatment system for cooking machines, which is adapted for installing cooking equipment of a cooking machine by constructing a closed cooking cavity, so that cooking fume generated by the cooking equipment is gathered in the closed cooking cavity and cannot directly escape out of the cooking machine, and meanwhile, a cooking fume treatment device is communicated with the cooking equipment and/or the closed cooking cavity, so that cooking fume generated by the cooking equipment is discharged into the environment after being treated by the cooking fume treatment device, or the cooking fume is continuously circulated in the closed cooking cavity and the cooking fume treatment device to realize zero emission of the cooking fume, and the influence of cooking fume of the cooking machine on the environment can be greatly reduced.

In the following, the specific implementation structure, the specific implementation manner and the working principle of the cooking fume treatment system for cooking machines provided by the invention applied to a specific implementation environment (such as a cooking machine) are described and explained in detail by combining a plurality of specific embodiments.

Example 1

Figure 1:
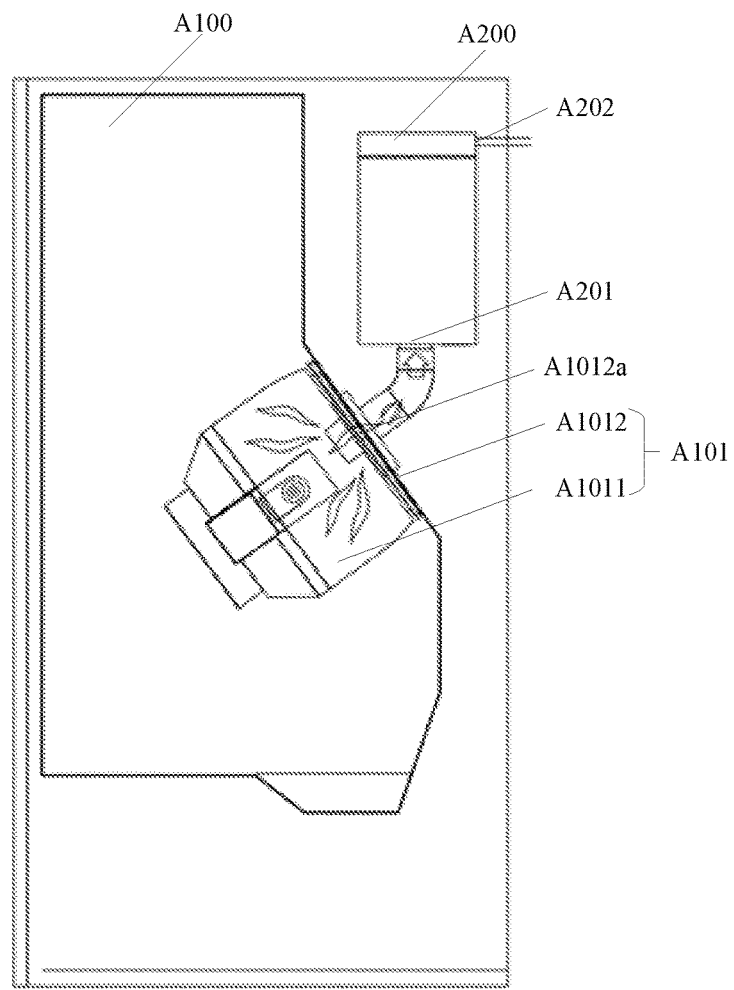
FIG. 1 is a structural schematic diagram of the cooking fume treatment system for cooking machines according to the first embodiment of the invention.

Please refer to FIG. 1 which is a structural schematic diagram of the cooking fume treatment system for cooking machines in the first embodiment of the invention.

In the embodiment, the cooking fume treatment system for cooking machines comprises a sealed cooking cavity A100 and a first cooking fume treatment device A200.

Cooking equipment A101 is arranged in the sealed cooking cavity A100. The first cooking fume treatment device A200 is provided with a first cooking fume inlet A201 and a first cooking fume outlet A202. The first cooking fume inlet A201 of the first cooking fume treatment device A200 is communicated with the cooking equipment A101, and the first cooking fume outlet A202 of the first cooking fume treatment device A200 is communicated to the external of the sealed cooking cavity A100.

In the embodiment, the cooking equipment A101 comprises a wok A1011 and a wok lid A1012, and the wok lid A1012 is matched with a wok opening of the wok A1011 so as to close or open the wok A1011; an air outlet hole A1012$a$ is formed in the wok lid A1012, and the first cooking fume inlet A201 of the first cooking fume treatment device A200 is in sealed connection with the air outlet hole A1012$a$ via a cooking fume inlet pipe so as to communicate with the cooking equipment A101.

Figure 2:
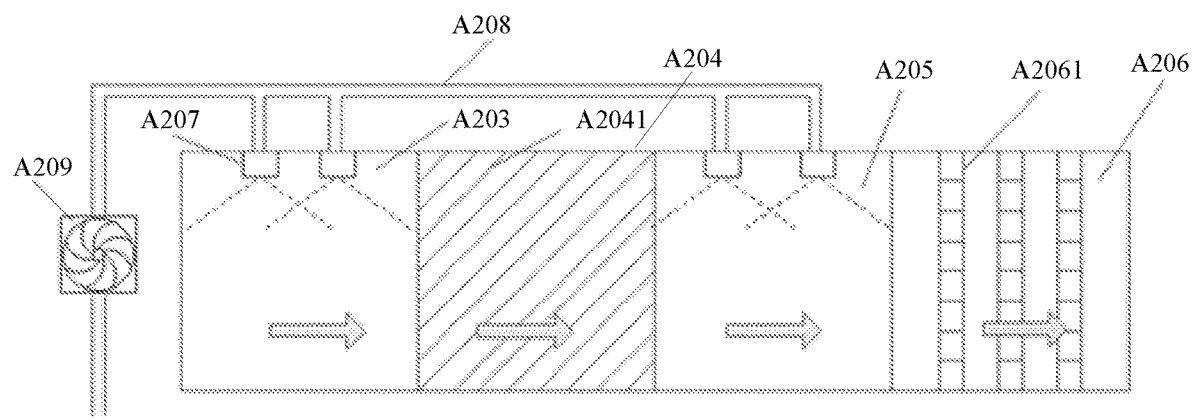
FIG. 2 is a structural schematic diagram of the cooking fume treatment device according to the first embodiment of the invention.

Please refer to FIG. 2 which is a structural schematic diagram of the cooking fume treatment device in the first embodiment of the invention.

In the embodiment, the first cooking fume treatment device A200 comprises a first spraying chamber A203, a condensing chamber A204, a second spraying chamber A205, a filtering chamber A206, a plurality of atomizing nozzles A207, a spraying pipeline A208 and a water spraying pump A209; the first spraying chamber A203, the condensing chamber A204, the second spraying chamber A205 and the filtering chamber A206 are sequentially communicated.

A common side wall is arranged between the first spraying chamber A203 and the condensing chamber A204, and another common side wall is arranged between the condensing chamber A204 and the second spraying chamber A205; the plurality of atomizing nozzles A207 are arranged at the top portions of the first spraying chamber A203 and the second spraying chamber A205 and are connected with the water spraying pump A209 through the spraying pipeline A208; a condenser A2041 is arranged in an inner cavity of the condensing chamber A204; and a plurality of filtering screens A2061 distributed in parallel are arranged in the filtering chamber A206.

The first cooking fume inlet A201 is formed in a bottom portion of the first spraying chamber A203 or a side wall, away from the condensing chamber A204, of the first spraying chamber A203, and the first cooking fume outlet A202 is formed in a side wall, away from the second spraying chamber A205, of the filtering chamber A206.

When the cooking machine works, the wok A1011 is closed by the wok lid A1012, cooking fume generated by the cooking equipment A101 enters the first cooking fume treatment device A200 from the air outlet hole A1012a of the wok lid A1012 and sequentially passes through the first spraying chamber A203, the condensing chamber A204, the second spraying chamber A205 and the filtering chamber A206, and the gradual treatment process of spraying, condensing, re-spraying and filtering is achieved. As shown by arrows in the FIG. 2, the cooking fume is firstly sprayed by the first spraying chamber A203 to achieve a primary cooling effect, and meanwhile, atomized water vapor can adsorb part of dust particles and toxic substances to primarily realize cooking fume separation; then, heat exchange is carried out between the condensing chamber A204 and the condenser A2041, the cooking fume is sufficiently cooled, grease in the cooking fume is condensed into oil liquid so as to be separated from the cooking fume, and most of the grease in the cooking fume can be removed; and then, the cooking fume is sprayed by atomized water vapor of the second spraying chamber A205 to be further cooled and adsorbed, at the moment, the cooking fume is completely cooled, and oil particles and dust components contained in the cooking fume are very little; and finally, the cooking fume enters the filtering chamber A206 and passes through the layer-by-layer filtering screens A2061 in the filtering chamber A206, remaining macromolecular substances such as grease and dust can be filtered out, the cooking fume treatment capacity is greatly enhanced, a large amount of cooking fume generated in the cooking process is rapidly and effectively treated, and therefore gas exhausted from the first cooking fume outlet A202 is basically consistent with fresh air in component.

Preferably, the first cooking fume treatment device A200 further comprises a fan A210, a water storage tank A211, a plurality of flushing nozzles A212, a flushing pipeline A213 and a flushing water pump A214.

Figure 3:
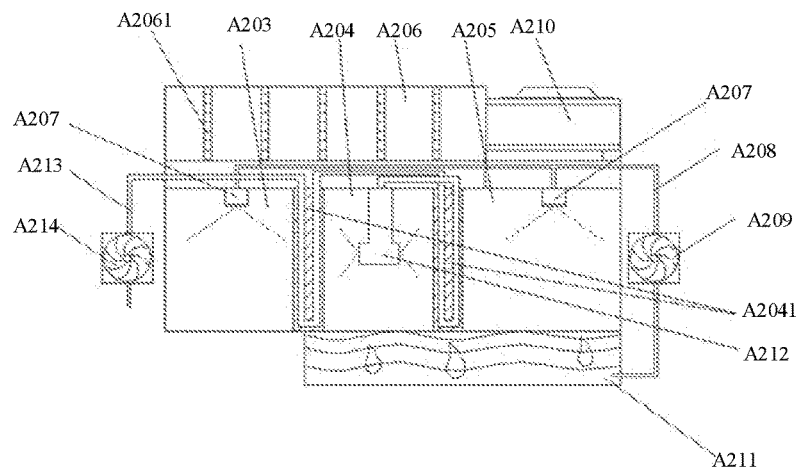
FIG. 3 is a schematic structure diagram of another cooking fume treatment device according to the first embodiment of the invention.

As shown in the FIG. 3, the fan A210 is arranged between the second spraying chamber A205 and the filtering chamber A206 so as to communicate the second spraying chamber A205 with the filtering chamber A206. The water storage tank A211 is located below the second spraying chamber A205 and the condensing chamber A204, an inner cavity of the second spraying chamber A205 is formed by the capacity horizontal plane of the water storage tank A211 and the side walls and the top portion of the second spraying chamber A205, and an inner cavity of the condensing chamber A204 is formed by the capacity horizontal plane of the water storage tank A211 and the side walls and the top portion of the condensing chamber A204; the water storage tank A211 is communicated with the water spraying pump A209, so that water in the second spraying chamber A205, the first spraying chamber A203 and the water storage tank A211 circularly flows; the common side wall between the first spraying chamber A203 and the condensing chamber A204 and the common side wall between the condensing chamber A204 and the second spraying chamber A205 are also provide with the condensers A2041.

The plurality of flushing nozzles A212 are arranged at the top portion of the condensing chamber A204; and each flushing nozzle A212 is connected with the flushing water pump A214 through the flushing pipeline A213. The filtering chamber A206 is located above the first spraying chamber A203 and the condensing chamber A204, and gaps are formed between the filtering chamber A206 and the first spraying chamber A203 and between the filtering chamber A206 and the condensing chamber A204 to contain the spraying pipeline A208 and the flushing pipeline A213.

The water storage tank A211 is located below the second spraying chamber A205 and the condensing chamber A204, and the water storage tank A211 communicates with the water spraying pump A209, so that flushed water and liquid drops formed by the condensation and adsorption of the cooking by atomized water vapor directly enter the water storage tank A211; liquefied water in the water storage tank A211 is changed into atomized water vapor again through the water spraying pump A209 to condense and adsorb the cooking fume, so that an internal circulation system of the first cooking fume treatment device A200 is formed, cyclic utilization of water resources is achieved while the cooking fume is effectively treated, and waste of the water resources is avoided. As the filtering chamber A206 is located above the first spraying chamber A203 and the condensing chamber A204, and gaps are formed between the filtering chamber A206 and the first spraying chamber A203 and between the filtering chamber A206 and the condensing chamber A204 to contain the spraying pipeline A208 and the flushing pipeline A213, the first cooking fume treatment device A200 is more compact in structure, saves space and conforms to the trend of miniaturization and high efficiency of equipment. The fan A210 is located between the second spraying chamber A205 and the filtering chamber A206 so as to communicate the second spraying chamber A205 with the filtering chamber A206, negative pressure is formed in the first spraying chamber A203, the condensing chamber A204, the second spraying chamber A205 and the filtering chamber A206 by the fan A210, positive pressure is formed in the cooking equipment A101 which is heated, so that cooking fume flows to the first cooking fume treatment device A200 from the cooking equipment A101, the hot air flow with the cooking fume is sequentially subjected to spraying, condensing and filtering, the flowing is smooth, most of the cooking fume is effectively filtered, and therefore clean gas is exhausted. The plurality of flushing nozzles A212 are arranged at the top portion of the condensing chamber A204 and can flush the condensers A2041 arranged at the common side wall and the condensing chamber A204, so that the condensers A2041 are kept clean, and the situation that the condensation effect is affected due to the fact that oil drops are attached to the surface of the condensers A2041 is avoided.

Figure 4:
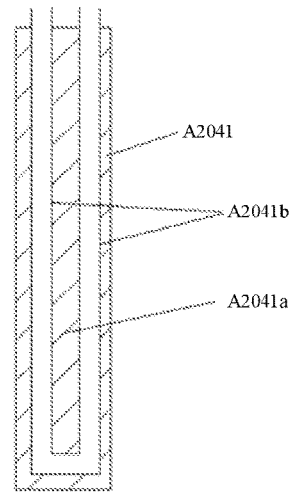
FIG. 4 is a schematic diagram of a structure of the condenser according to the first embodiment of the invention.

Referring to FIG. 4, in this embodiment, the condenser A2041 includes a plurality of cooling fins A2041a and a condenser tube A2041b. Gaps among the cooling fins A2041a form channels for cooking fume from the first spraying chamber A203 to the condensing chamber A204 and from the condensing chamber A204 to the second spraying chamber A205, and based on the structure, the cooking fume with high-heat penetrates through the gaps among the cooling fins A2041a and the exterior of the condensing pipes A2041b of the condenser A2041, and is cooled by the metal on the cooling fins A2041a and the condensing pipes A2041b, so that and heat exchanges is sufficiently performed, the purpose of reducing the temperature of the cooking fume is achieved, and grease in the cooking fume is condensed into oil liquid.

Preferably, each condenser A2041 may be formed by mutually nesting the cooling fins A2041a and the condensing pipe A2041b, so that the structure is more favorable for heat transfer and exchange, and the condensing effect is accelerated.

In the embodiment, the condensing pipe A2041b is connected with the flushing water pump A214 and the flushing nozzle A212 via the flushing pipeline A213; when the flushing spray head A212 carries out flushing work, flowing of water can take away heat, absorbed by the condensing pipe A2041b, of cooking fume gas, the temperature of the condensing pipe A2041b is reduced, and therefore the condensing pipe A2041b can continue to carry out heat exchange with the cooking fume, and the cooking fume treatment efficiency is improved.

It should be noted that the first cooking fume treatment device provided by the embodiment of the invention is only an example, and cooking fume treatment devices with other structures can also be adopted, for example, the first cooking fume treatment device of the embodiment can also adopt the structure shown in the FIG. 8 in the embodiment 3 described below or the structure of the cooking fume treatment device mentioned in other embodiments, the technical problem to be solved by the embodiment of the invention can also be solved, and the corresponding technical effect can be obtained.

Compared with the prior art, the cooking fume treatment system for cooking machines by the embodiment has the advantages that the sealed cooking cavity A100 is arranged, so that cooking fume generated by the cooking equipment A101 of the cooking machine is sealed in the sealed cooking cavity A100 and can be discharged into the environment only after being treated by the first cooking fume treatment device A200, so that the influence of the cooking machine cooking fume on the environment is reduced.

Example 2

Figure 5:
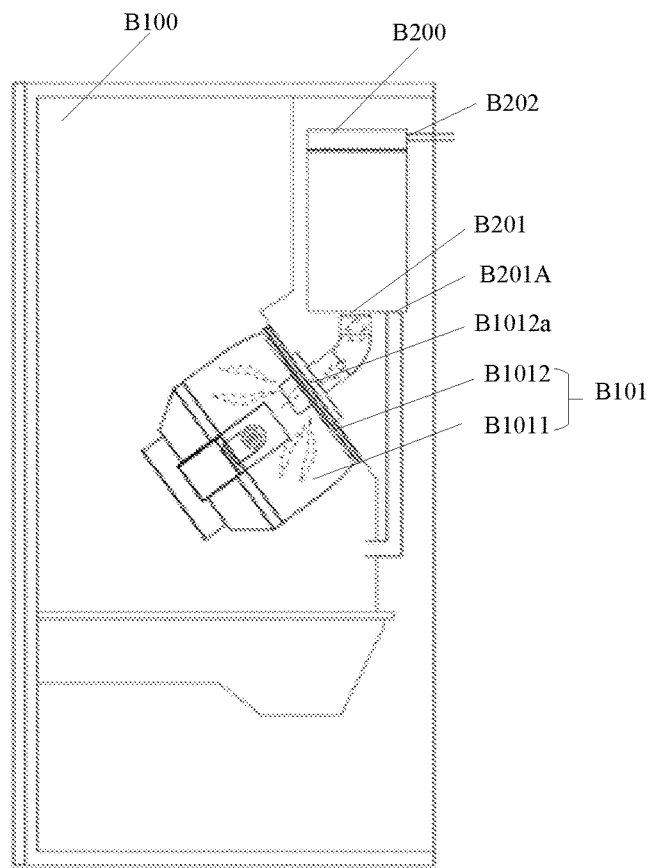
FIG. 5 is a structural schematic diagram of the cooking fume treatment system for cooking machines provided by the second embodiment of the invention.

Please refer to FIG. 5, which is a structural schematic diagram of the cooking fume treatment system for cooking machines provided by the second embodiment of the invention.

In the embodiment, the cooking fume treatment system for cooking machines comprises a sealed cooking cavity B100 and a first cooking fume treatment device B200.

Cooking equipment B101 is arranged in the sealed cooking cavity B100. The first cooking fume treatment device B200 is provided with a first cooking fume inlet B201, a second cooking fume inlet B201A and a first cooking fume outlet B202. The first cooking fume inlet B201 of the first cooking fume treatment device B200 is communicated with the cooking equipment B101, the second cooking fume inlet B201A is communicated with the sealed cooking cavity B100, and the first cooking fume outlet B202 of the first cooking fume treatment device B200 is communicated to the external of the sealed cooking cavity B100.

In the embodiment, the cooking equipment B101 comprises a wok B1011 and a wok lid B1012, and the wok lid B1012 is matched with a wok opening of the wok B1011 so as to close or open the wok B1011; an air outlet hole B1012a is formed in the wok lid B1012, and the first cooking fume inlet B201 of the first cooking fume treatment device B200 is in sealed connection with the air outlet hole B1012a via a cooking fume inlet pipe so as to be communicated with the cooking equipment B101.

Figure 6:
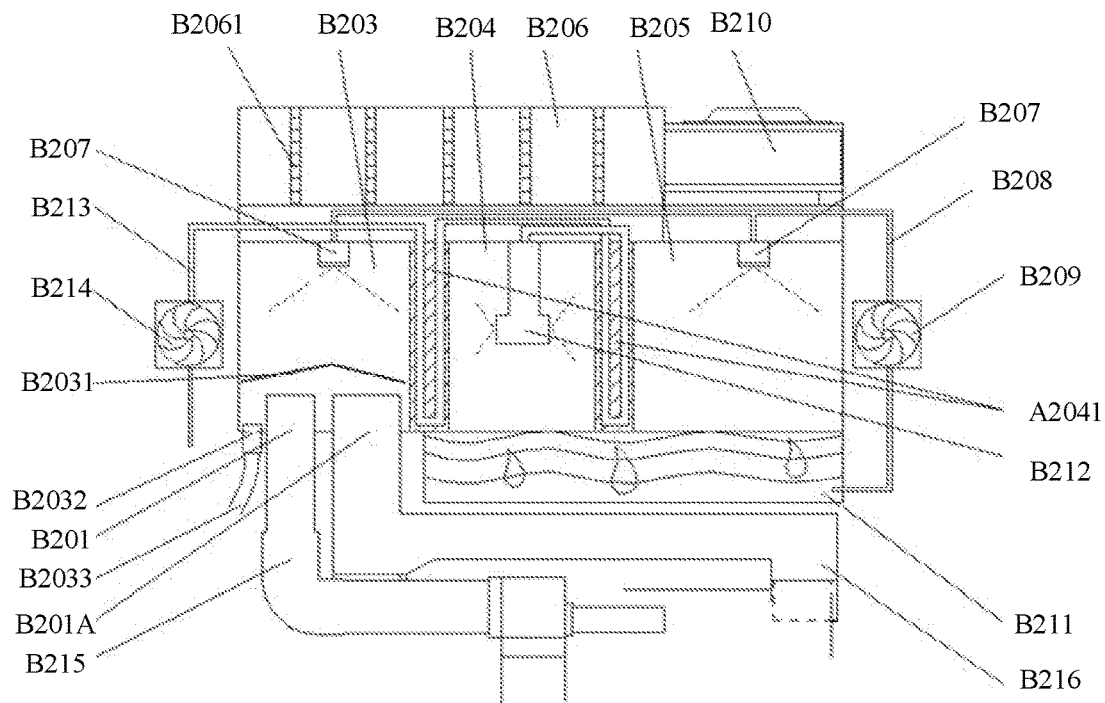
FIG. 6 is a structural schematic diagram of the cooking fume treatment device according to the second embodiment of the invention.

Please refer to FIG. 6, which is a structural schematic view of a cooking fume treatment device in the second embodiment of the invention.

In the embodiment, the first cooking fume treatment device B200 comprises a first spraying chamber B203, a condensing chamber B204, a second spraying chamber B205, a filtering chamber B206, a plurality of atomizing nozzles B207, a spraying pipeline B208, a water spraying pump B209, a first fan B210, a water storage tank B211, a plurality of flushing nozzles B212, a flushing pipeline B213 and a flushing water pump B214; the first spraying chamber B203, the condensing chamber B204, the second spraying chamber B205 and the filtering chamber B206 are sequentially communicated.

A common side wall is arranged between the first spraying chamber B203 and the condensing chamber B204, and another common side wall is arranged between the condensing chamber B204 and the second spraying chamber B205.

The first fan B210 is arranged between the second spraying chamber B205 and the filtering chamber B206 so as to communicate the second spraying chamber B205 with the filtering chamber B206.

The water storage tank B211 is located below the second spraying chamber B205 and the condensing chamber B204, an inner cavity of the second spraying chamber B205 is formed by the capacity horizontal plane of the water storage tank B211 and the side walls and the top portion of the second spraying chamber B205, and an inner cavity of the condensing chamber B204 is formed by the capacity horizontal plane of the water storage tank B211 and the side walls and the top portion of the condensing chamber B204.

The plurality of atomizing nozzles B207 are arranged at the top portions of the first spraying chamber B203 and the second spraying chamber B205 and connected with the water spraying pump B209 via the spraying pipeline B208.

The plurality of flushing nozzles B212 are arranged at the top portion of the condensing chamber B204, and each flushing nozzle B212 is connected with the flushing water pump B214 via the flushing pipeline B213. The inner cavity of the condensing chamber B204, the common side wall between the first spraying chamber B203 and the condensing chamber B204 and the common side wall between the condensing chamber B204 and the second spraying chamber B205 are provided with condenser B2041.

The water storage tank B211 is communicated with the water spraying pump B209, so that water in the second spraying chamber B205, the first spraying chamber B203 and the water storage tank B211 circularly flows.

The filtering chamber B206 is located above the first spraying chamber B203 and the condensing chamber B204, and gaps are formed between the filtering chamber B206 and the first spraying chamber B203 and between the filtering chamber B206 and the condensing chamber B204 to contain the spraying pipeline B208 and the flushing pipeline B213. A plurality of filtering screens B2061 which are distributed in parallel are arranged in the filtering chamber B206.

In the embodiment, the first cooking fume inlet B201 and the second cooking fume inlet B201A are formed in the bottom portion of the first spraying chamber B203. The first cooking fume inlet B201 is communicated with the air outlet B1012*a* in the wok lid B1012, and the second cooking fume inlet B201A is communicated with the sealed cooking cavity B100. The first cooking fume outlet B202 is formed in a side wall, far away from the first fan B210, of the filtering chamber B206.

In the embodiment of the present invention, an inverted V-shaped channel opening protecting sheet B2031 is further arranged in the first spraying chamber B203. The channel opening protection piece B2031 is located above the first cooking fume inlet B201 and the second cooking fume inlet B201A, and a gap is reserved between the channel opening protection piece B2031 and the side wall of the first spraying chamber B203; the bottom portion of the first spraying chamber B203 and the capacity horizontal plane of the water storage tank B211 are located on the same plane, an overflow opening B2032 and a draining pipe B2033 are further formed in the bottom portion of the first spraying chamber B203, and the overflow opening B2032 is connected with one end of the draining pipe B2033.

Based on the structure, cooking fume in the wok B1011 of the cooking machine and cooking fume in the sealed cooking cavity B100 of the cooking machine respectively enter the first cooking fume treatment device B200 from the first cooking fume inlet B201 and the second cooking fume inlet B201A. Cooking fume in the wok B1011 of the cooking machine and the sealed cooking cavity B100 of the cooking machine is purified by the cooking fume treatment device and then is discharged into the environment, so that the cooking fume is prevented from polluting the environment.

Preferably, the first cooking fume treatment device B200 further comprises a first cooking fume inlet pipe B215 and a second cooking fume inlet pipe B216. One end of the first cooking fume inlet pipe B215 penetrates through the first cooking fume inlet B201 and is located under the channel opening protection piece B2031, and one end of the second cooking fume inlet pipe B216 penetrates through the second cooking fume inlet B201A and is located under the channel opening protection piece B2031.

In the embodiment, the inverted-V-shaped channel opening protecting piece B2031 is arranged in the first spraying chamber B203, the channel opening protecting piece B2031 is located above the first cooking fume inlet B201 and the second cooking fume inlet B201A, and the gap is reserved between the channel opening protecting piece B2031 and the side wall of the first spraying chamber B203 so as to prevent condensed liquid in the first spraying chamber B203 from entering the cooking equipment B101 to cause pollution and blockage; condensed liquid formed after the atomized water vapor in the first spraying chamber B203 condenses and adsorbs the cooking fume rolls along the surface of the inverted V-shaped channel protection piece B2031 and then reaches the bottom portion of the first spraying chamber B203 from the gap between the channel opening protection piece B2031 and the side wall of the first spraying chamber B203; the bottom portion of the first spraying chamber B203 and the capacity horizontal plane of the water storage tank B211 are located on the same plane, and the overflow opening B2032 is formed in the bottom portion of the first spraying chamber B203, so when the liquid level of the water storage tank B211 is higher than the overflow opening B2032, redundant water is drained from the overflow opening B2032, and thereby keeping the liquid level in the water storage tank B211 with a capacity horizontal plane. By means of the embodiment, the cooking fume treatment device is more complete in function, capable of effectively treating cooking fume, suitable for treating a large amount of cooking fume generated during work of the cooking machine and remarkable in effect.

Compared with the prior art, the cooking fume treatment system for cooking machines by the embodiment has the advantages that the first cooking fume inlet B201 of the first cooking fume treatment device B200 is communicated with the cooking equipment B101, the second cooking fume inlet B201A is communicated with the sealed cooking cavity B100, and the first cooking fume outlet B202 of the first cooking fume treatment device B200 is communicated to the external of the sealed cooking cavity B100, so that the cooking fume in the cooking equipment B101 and the sealed cooking cavity B100 is discharged into the environment after being purified by the first cooking fume treatment device B200, and the influence of the cooking fume on the environment is greatly reduced.

Example 3

Figure 7:
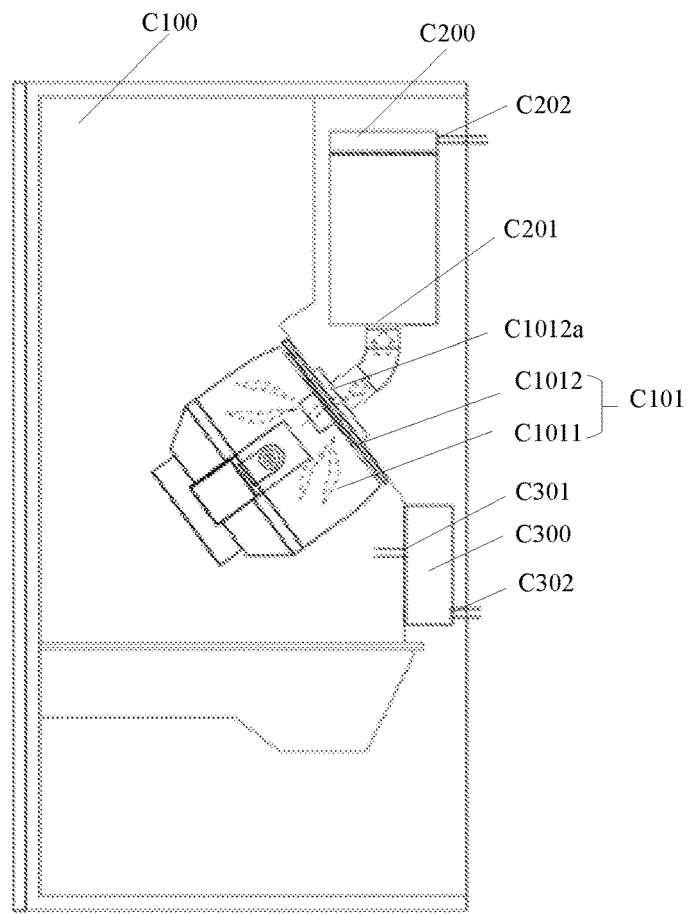
FIG. 7 is a structural schematic diagram of the cooking fume treatment system for cooking machines provided by the third embodiment of the invention.

Please refer to FIG. 7, which is a structural schematic diagram of the cooking fume treatment system for cooking machines provided by the third embodiment of the invention.

In the embodiment, the cooking fume treatment system for cooking machines comprises a sealed cooking cavity C100, a first cooking fume treatment device C200 and a second cooking fume treatment device C300.

Cooking equipment C101 is arranged in the sealed cooking cavity C100. The first cooking fume treatment device C200 is provided with a first cooking fume inlet C201 and a first cooking fume outlet C202. The first cooking fume inlet C201 of the first cooking fume treatment device C200 is communicated with the cooking equipment C101, and the first cooking fume outlet C202 of the first cooking fume treatment device C200 is communicated to the external of the sealed cooking cavity C100. The second cooking fume treatment device C300 is provided with a third cooking fume inlet C301 and a second cooking fume outlet 3C02, the third cooking fume inlet C301 is communicated with the sealed cooking cavity C100, and the second cooking fume outlet C302 is communicated to the external of the sealed cooking cavity C100.

In the embodiment, the cooking equipment C101 comprises a wok C1011 and a wok lid C1012, and the wok lid C1012 is matched with a wok opening of the wok C1011 so as to close or open the wok C1011; an air outlet hole C1012*a* is formed in the wok lid C1012, and the first cooking fume inlet C201 of the first cooking fume treatment device C200 is in sealed connection with the air outlet hole C1012*a* so as to be communicated with the cooking equipment C101.

Figure 8:
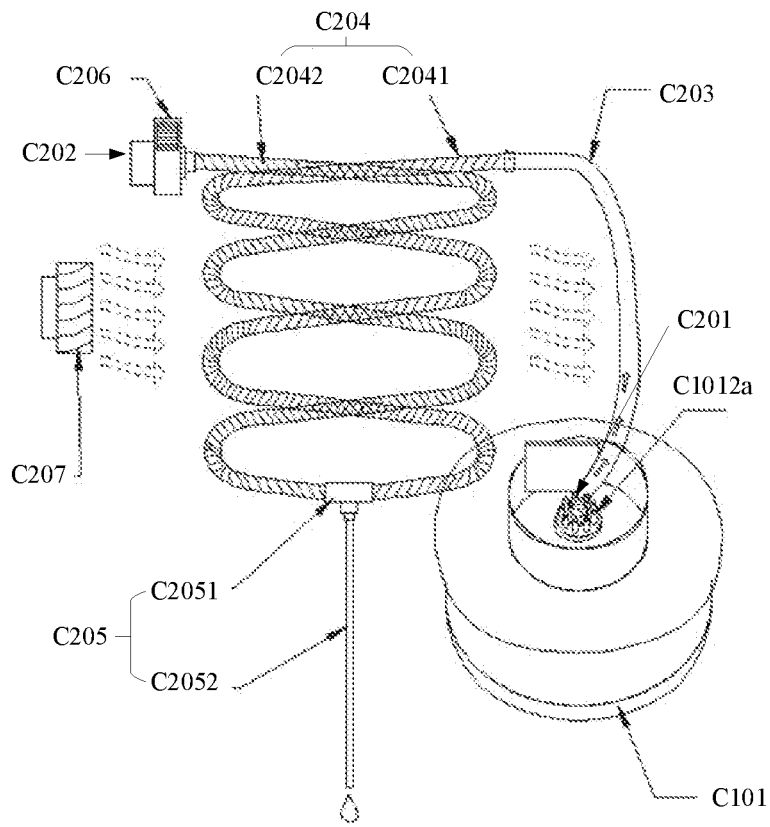
FIG. 8 is a schematic structure diagram of the first cooking fume treatment device according to the third embodiment of the invention.

Please refer to FIG. 8, which is a structural schematic diagram of the first cooking fume treatment device in the third embodiment of the invention.

In the embodiment, the first cooking fume treatment device C200 comprises a fume guiding pipe C203, a condensing pipe C204, a condensate collector C205 and a pipeline fan C206.

An air inlet end of the fume guiding pipe C203 is connected with an air outlet hole C1012*a* of the wok lid C1012, an air outlet end of the fume guiding pipe C203 is connected with an air inlet end of the condensing pipe C204, an air outlet end of the condensing pipe C204 is connected with the pipeline fan C206, and an exhaust end of the pipeline fan C206 is communicated with the environment; the condensate collector C205 is connected to the middle portion of the condensing pipe C204, and specifically, the condensate collector C205 is connected to a break or opening of the middle portion of the condensing pipe C204. The height of the location of the condensate collector C205 is lower than that of the air inlet end and the air outlet end of the condensing pipe C204. Preferably, the condensate collector C205 may comprise a liquid storage container C2051, a draining control valve (not shown), and a draining pipe C2052.

In the embodiment, the air inlet end of the fume guiding pipe C203 is used as the first cooking fume inlet C201 of the first cooking fume treatment device C200, and the exhaust end of the pipeline fan C206 is used as the first cooking fume outlet C202 of the first cooking fume treatment device C200.

In the embodiment, the condensing pipe C204 comprises a first condensing pipe C2041 and a second condensing pipe C2042 which are extended in vertical direction. A gas inlet end of the first condensing pipe C2041 is connected with the gas outlet end of the fume guiding pipe C203, a gas outlet end of the first condensing pipe C2041 is connected with a gas inlet end of the second condensing pipe C2042, a gas outlet end of the second condensing pipe C2042 is connected with the gas inlet of the pipeline fan C206, and the condensate collector C205 is arranged at the joint of the first condensing pipe C2041 and the second condensing pipe C2042.

The first condensing pipe C2041 and the second condensing pipe C2042 are Snake-shaped condensing pipes. Preferably, the first condensing pipe C2041 and the second condensing pipe C2042 are symmetrically distributed in a mutually crossed manner. The first condensing pipe C2041 and the second condensing pipe C2042 are intersected at the condensate collector C205. The draining pipe C2052 of the condensate collector C205 vertically extends downwards and is used for discharging the condensate collected by the liquid storage container C2051 of the condensate collector C205 out of the first cooking fume treatment device C200 for treatment.

When in operation, negative pressure is generated in the first condensing pipe C2041 and the second condensing pipe C2042 by the pipeline draught fan C206, cooking fume enters the first condensing pipe C2041 via the fume guiding pipe C203, some of the cooking fume is condensed into liquid, and the liquid flows into the condensate collector C205, and the other part of the cooking fume continues to enter a second condensing pipe C2042 under the action of negative pressure to be condensed and becomes liquid to flow into the condensate collector C205; by adopting the structure of the double condensing pipes, the condensation efficiency can be greatly improved. The condensing pipe C204 can be made of metal materials, cooling can be rapidly carried out through the characteristics of metal, the condensation efficiency is high, and the effect is good.

The fume guiding pipe C203 can be made of materials which are slow in heat conduction and dissipation and poor in condensation effect, such as plastic, silica gel, nylon, etc. The fume guiding pipe C203 is used for connecting the cooking equipment C101 and the condensing pipe C204 to achieve the flow of airflow therebetween, and therefore it is desirable to ensure that the hot airflow with cooking fume does not condensed in the fume guiding pipe C203. The fume guiding pipe C203 extends in the vertical direction, an air inlet of the fume guiding pipe C203 is connected with the cooking equipment C101, an air outlet of the fume guiding pipe C203 is connected with the second condensing pipe C2042 through a connecting piece, and the air outlet of the fume guiding pipe C203 is higher than the air inlet of the fume guiding pipe C203.

Preferably, the first cooking fume treatment device C200 further comprises a radiator C207 used for radiating the condensing pipe C204. The radiator C207 can be a cooling fan, cooling air is provided for the condensing pipe C204 by the cooling fan, and air-cooling heat dissipation treatment is carried out on the condensing pipe C204. Besides, the radiator C207 can also be a condensation box filled with a liquid cooling medium, and the condensing pipe C204 is immersed in the cooling medium, so that the condensing pipe C204 is in direct contact with the cooling medium for cooling, the heat dissipation speed of the condensing pipe C204 is increased, and the condensation efficiency of cooking fume is improved.

Figure 9:
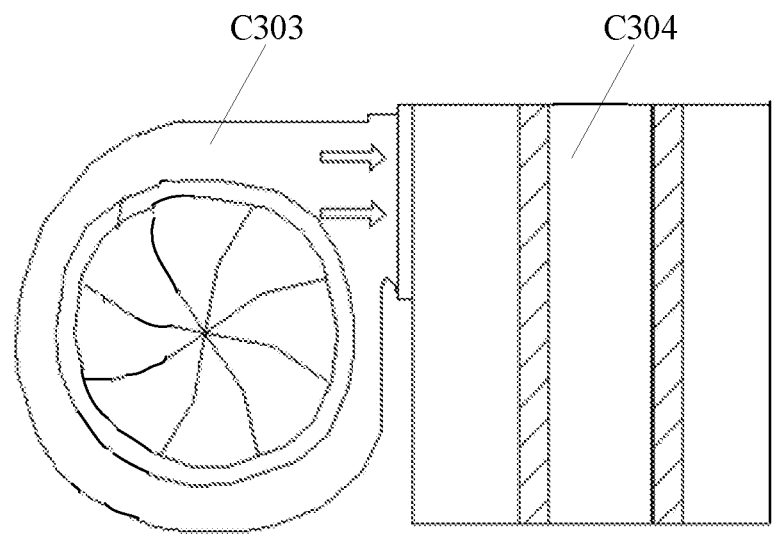
FIG. 9 is a schematic structure diagram of the second cooking fume treatment device according to the third embodiment of the invention.

Please refer to FIG. 9, which is a structural schematic diagram of the second cooking fume treatment device provided by the third embodiment of the invention.

In the embodiment, the second cooking fume treatment device C300 comprises a second fan C303 and a screen filter C304.

An air inlet of the second draught fan C303 is communicated with the sealed cooking cavity C100', an air outlet of the second fan C303 is connected with an air inlet of the screen filter C304, and an air outlet of the screen filter C304 is communicated to the external of the sealed cooking cavity C100.

The second fan C303 is used for extracting the cooking fume in the sealed cooking cavity C100 to the screen filter C304 for filtering treatment and then discharging the cooking fume into the environment.

In the embodiment, the air inlet of the second fan C303 is used as the third cooking fume inlet C301 of the second cooking fume treatment device C300, and the air outlet of the screen filter C304 is used as the second cooking fume outlet C302 of the second cooking fume treatment device C300.

Based on the above structure, cooking fume in the sealed cooking cavity C100 is filtered by the screen filter C304 and then is discharged into the environment, so that the influence of the cooking fume on the environment is effectively prevented.

It should be noted that the structure of the second cooking fume treatment device in the embodiment is only an example, the structure of the second cooking fume treatment device can also be the same as that of the first cooking fume treatment device, and the second cooking fume treatment device can also be a cooking fume treatment device of other structures, such as the cooking fume treatment devices in the example 1 and the example 2, which is not specifically limited herein.

Compared with the prior art, the cooking fume treatment system for cooking machines has the advantages that the first cooking fume treatment device C200 and the second cooking fume treatment device C300 are arranged to purify cooking fume in the cooking equipment C101 and cooking fume in the sealed cooking cavity C100 respectively and then discharge the purified cooking fume, and pollution of the cooking fume to the environment is effectively reduced.

Example 4

Figure 10:
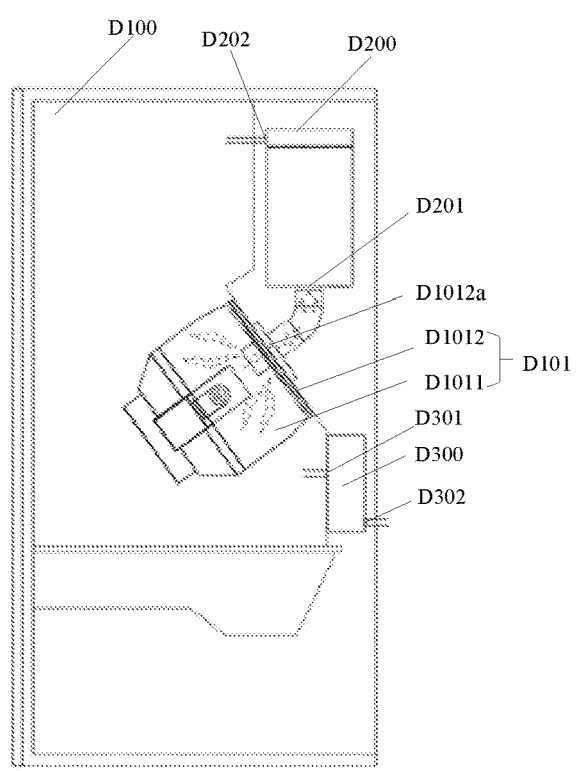
FIG. 10 is a structural schematic diagram of the cooking fume treatment system for cooking machines provided by the fourth embodiment of the invention.

Please refer to FIG. 10, which is a structural schematic diagram of the cooking fume treatment system for cooking machines in the fourth embodiment of the invention.

In the embodiment, the cooking fume treatment system for cooking machines comprises a sealed cooking cavity D100, a first cooking fume treatment device D200 and a second cooking fume treatment device D300.

Cooking equipment D101 is arranged in the sealed cooking cavity D100. The first cooking fume treatment device D200 is provided with a first cooking fume inlet D201 and a first cooking fume outlet D202. The first cooking fume inlet D201 of the first cooking fume treatment device D200 is communicated with the cooking equipment D101, and the first cooking fume outlet D202 of the first cooking fume treatment device D200 is communicated with the sealed cooking cavity D100. The second cooking fume treatment device D300 is provided with a third cooking fume inlet D301 and a second cooking fume outlet D302, the third cooking fume inlet D301 is communicated with the sealed cooking cavity D100, and the second cooking fume outlet D302 is communicated to the external of the sealed cooking cavity D100.

In the embodiment, the cooking equipment D101 comprises a wok D1011 and a wok lid D1012, and the wok lid D1012 is matched with a wok opening of the wok D1011 so as to close or open the wok D1011; an air outlet hole D1012a is formed in the wok lid D1012, and the first cooking fume inlet D201 of the first cooking fume treatment device D200 is in sealed connection with the air outlet hole D1012a so as to communicate with the cooking equipment D101.

In the embodiment, the structure of the first cooking fume treatment device D200 is the same as that of the first cooking fume treatment device C200 in the third embodiment, and the structure of the second cooking fume treatment device D300 is the same as that of the second cooking fume treatment device C200 in the third embodiment.

It should be noted that the first cooking fume treatment device D200 and the second cooking fume treatment device D300 may also be cooking fume treatment devices of other structures, such as the cooking fume treatment devices described in the first embodiment and the second embodiment, which is not specifically limited herein.

Compared with the prior art, the cooking fume treatment system for cooking machines has the advantages that the first cooking fume inlet D201 of the first cooking fume treatment device D200 is communicated with the cooking equipment D101, and the first cooking fume outlet D202 of the first cooking fume treatment device D200 is communicated with the sealed cooking cavity D100, so that the cooking fume treated by the first cooking fume treatment device D200 is discharged into the sealed cooking cavity D100; meanwhile, the second cooking fume treatment device D300 is arranged, the third cooking fume inlet D301 of the second cooking fume treatment device D300 is communicated with the sealed cooking cavity D100, and the second cooking fume outlet D302 of the second cooking fume treatment device D300 is communicated with the external of the sealed cooking cavity D100, so that the cooking fume treated by the first cooking fume treatment device D200 and the cooking fume escaping from the cooking equipment D101 are discharged into the environment after being treated by the second cooking fume treatment device D300, cooking fume discharged into the environment is greatly purified, and pollution of cooking machine cooking fume to the environment is reduced.

Example 5

Figure 11:
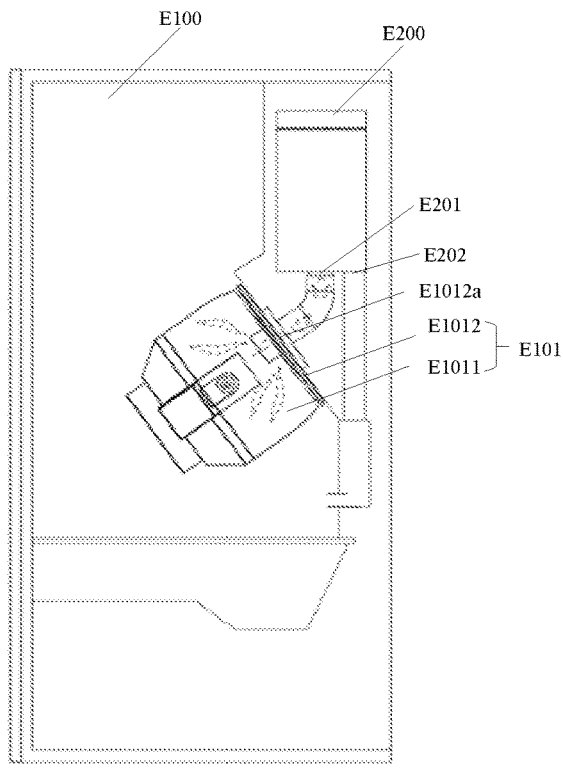
FIG. 11 is a structural schematic diagram of the cooking fume treatment system for cooking machines provided by the fifth embodiment of the invention.

Please refer to FIG. 11, which is a structural schematic diagram of the cooking fume treatment system for cooking machines in the fifth embodiment of the invention.

In the embodiment, the cooking fume treatment system for cooking machines comprises a sealed cooking cavity E100 and a first cooking fume treatment device E200.

Cooking equipment E101 is arranged in the sealed cooking cavity E100. The first cooking fume treatment device E200 is provided with a first cooking fume inlet E201 and a first cooking fume outlet E202. The first cooking fume inlet E201 of the first cooking fume treatment device E200 is communicated with the cooking equipment E101, and the first cooking fume outlet E202 of the first cooking fume treatment device E200 is communicated with the sealed cooking cavity E100.

In the embodiment, the cooking equipment E101 comprises a wok E1011 and a wok lid E1012, and the wok lid E1012 is matched with a wok opening of the wok E1011 so as to close or open the wok E1011; an air outlet hole E1012a is formed in the wok lid E1012, and the first cooking fume inlet E201 of the first cooking fume treatment device E200 is in sealed connection with the air outlet hole E1012a so as to be communicated with the cooking equipment E101.

Figure 12:
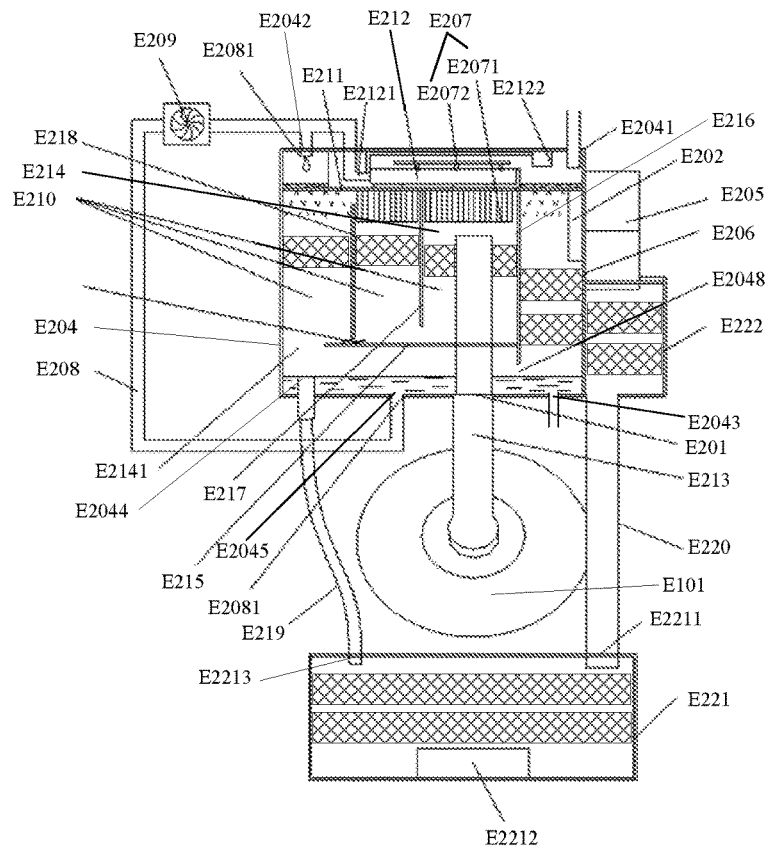
FIG. 12 is a structural schematic diagram of the cooking fume treatment device according to the fifth embodiment of the invention.
Figure 13:
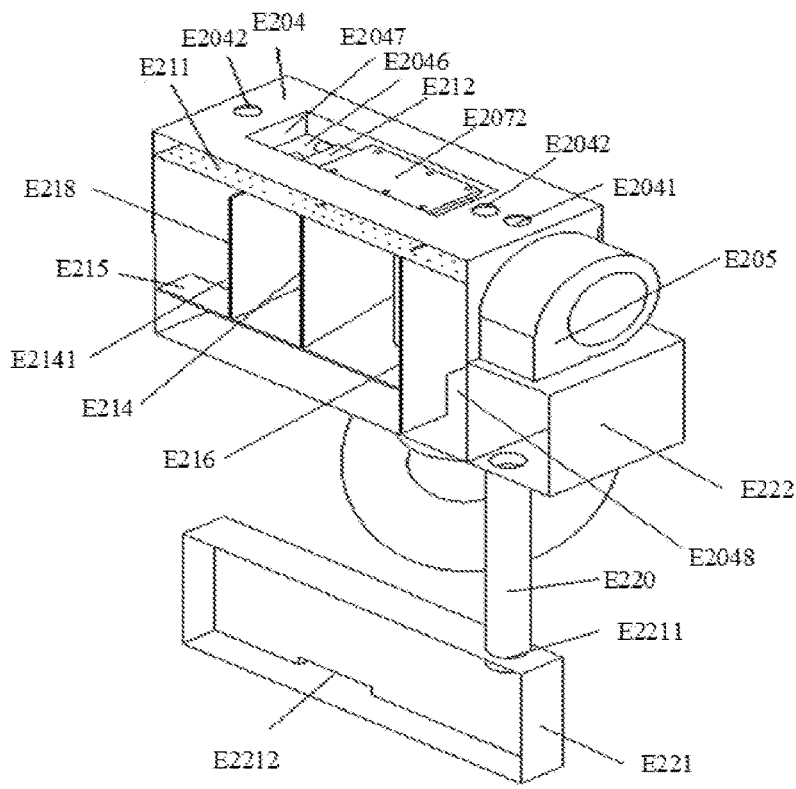
FIG. 13 is a partial cross-sectional view of a cooking fume treatment device according to a fifth embodiment of the present invention.

Referring to FIGS. 12-13, which are a structural schematic diagram of the first cooking fume treatment device E200 and a partial cross-sectional view of the first cooking fume treatment device E200 provided by the fifth embodiment of the invention.

In the embodiment, the first cooking fume treatment device E200 comprises a box body E204, a fan E205, a cooking fume filtering assembly E206, a miniature refrigerator E207, a water circulating pipeline E208, a water pump E209 and a control device (not shown).

The box body E204 is provided with a main water adding opening E2041, at least one circulating water inlet E2042, a first cooking fume inlet E201 and a first cooking fume outlet E202, and the bottom portion of the box body E204 is provided with a water draining opening E2043, a water level limiting water draining opening E2044 and at least one circulating water outlet E2045.

A cooking fume channel E210 communicating with the first cooking fume inlet E201 and the first cooking fume outlet E202 is formed in the box body E204, the first cooking fume inlet E201 communicates with the cooking equipment E101, and the first cooking fume outlet E202 communicates with the sealed cooking cavity E100.

The fan E205 is arranged at the first cooking fume outlet E202 and used for sucking cooking fume into the box body E204 from the first cooking fume inlet E201 and exhausting the cooking fume out from the first cooking fume outlet E202. The cooking fume filtering assembly E206 is arranged in the cooking fume channel E210. The miniature refrigerator E207 is preferably a semiconductor refrigerator, the miniature refrigerator E207 comprises at least one refrigeration sheet E2071 and a heat conduction part E2072, and the at least one refrigeration sheet E2071 is arranged in the cooking fume channel E210. The water circulating pipeline E208 comprises at least one first water outlet E2081 and at least one first water inlet E2082; each first water outlet E2081 is communicated with the corresponding circulating water inlet E2042, and each first water inlet E2082 is connected with the corresponding circulating water outlet E2045. And the water pump E209 is arranged in the water circulating pipeline E208, so that water at the lower part of the box body E204 is pumped into the box body E204 from the circulation water inlet E2042 through the water circulating pipeline E208 to spray and cool the cooking fume pipeline E210. And the fan E205, the miniature refrigerator E207 and the water pump E209 are all electrically connected with the control device.

In the cooking process of the cooking machine, cooking fume can be continuously generated in the cooking equipment E101, under the action of the fan E205, the cooking fume in the cooking equipment E101 enters the cooking fume channel E210 from the first cooking fume inlet E201 and then is filtered by the cooking fume filtering assembly E206. In the process, the refrigeration sheet E2071 of the miniature refrigerator E207 works to lower the temperature of the cooking fume channel E210, so that the cooking fume entering the cooking fume channel E210 is condensed, and the cooking fume filtering assembly E206 can better filter the cooking fume. In addition, under the action of the water pump E209, the water circulating pipeline E208 continuously sprays water to the cooking fume filtering assembly E206 located in the cooking fume channel E210 through the first water outlet E2081, so that the temperature in the cooking fume channel E210 is further reduced, and cooking fume can be effectively condensed, and therefore, the cooking fume filtering assembly E206 can still further better filter the cooking fume. The water falling to the bottom in the box body E204 can enter the water circulating pipeline E208 again under the action of the water pump E209. Besides, the cooking fume outlet 202 is communicated with the sealed cooking cavity E100, so that after cooking fume in the cooking equipment E101 enters the box body E204 from the first cooking fume inlet E201 and is subjected to cooking fume treatment, residual cooking fume enters the sealed cooking cavity E100 from the first cooking fume outlet E202 again, the process is repeated continuously, so that the cooking fume in the cooking equipment E101 can be effectively treated without being discharged out of the sealed cooking cavity E100, and therefore zero emission of the cooking fume is achieved.

Preferably, the first cooking fume treatment device E200 further comprises a spraying partition plate E211 provided with a plurality of spraying holes, and the spraying partition plate E211 is arranged between the cooking fume channel E210 and the top portion of the box body E204 so as to separate the cooking fume channel E210 from the top in the box body E204.

The main water adding opening E2041 and the at least one circulating water inlet E2042 are located above the spraying partition plate E211, so that water sprayed from the first water outlet E2081 connected with the circulating water inlet E2042 falls onto the spraying partition plate E211 and then dispersedly falls into the cooking fume channel E210 from the plurality of spraying holes of the spraying partition plate E211, and thereby achieving the effect of uniform spraying. Therefore, by arranging the spraying partition plate E211, water sprayed out of the first water outlet E2081 can be evenly sprayed into the cooking fume channel E210, and the cooking fume channel E210 can be cooled more effectively.

Preferably, the first cooking fume treatment device E200 further comprises a cooling body E212 of a hollow structure. A heat dissipation opening E2046 is formed in the top portion of the box body E204, and a containing cavity E2047 communicated with the heat dissipation opening E2046 is formed between the top portion of the box body E204 and the spraying partition plate E211. The heat conduction part E2072 of the miniature refrigerator E207 and the cooling body E212 are both arranged in the containing cavity E2047 so that heat generated by the heat conduction part E2072 of the miniature refrigerator E207 can be discharged out from the heat dissipation opening E2046.

The cooling body E212 is provided with a second water inlet E2121 and a second water outlet E2122, the second water inlet E2121 is communicated with the water outlet pipe section of the water circulating pipeline E208, and the second water outlet E2122 is located above the spraying partition plate E211, so that water of the water outlet pipe section of the water circulating pipeline E208 flows into the cooling body E212 from the second water inlet E2121, and then is sprayed onto the spraying partition plate E211 through the second water outlet E2122.

The cooling body E212 is in contact with the heat conduction part E2072 of the miniature refrigerator E207, so that cold water continuously flowing into the cooling body E207 can continuously take away heat of the heat conduction part E2072 to cool the heat conduction part E2072, and the miniature refrigerator E207 can better perform refrigeration work. It should be noted that the cooling body E207 can be of a box body structure, a bent pipeline structure or the like, which is not specifically limited herein.

Preferably, the first cooking fume treatment device E200 further comprises a cooking fume inlet pipe E213, a spraying cavity E214 with an opening in the top portion, a transverse partition plate E215, a first longitudinal partition plate E216, a second longitudinal partition plate E217, a third longitudinal partition plate E218, a draining pipe E219, a cooking fume outlet pipe E220, a first filtering box E221 and a second filtering box E222.

The top portion of the spraying cavity E214 is fixed to the bottom portion of the part, provided with the spraying holes, of the spraying partition plate E211, and the bottom portion of the spraying cavity E214 is located above the bottom portion in the box body E204 and provided with a through opening E2141. One end of the cooking fume inlet pipe E213 penetrates through the first cooking fume inlet E201 in a sealed manner in the direction towards the interior of the box body E204 and penetrates into the spraying cavity E214 in a sealed manner, and the other end of the cooking fume inlet pipe E213 is communicated with the cooking equipment E101. Under the action of the fan E205, the cooking fume in the cooking equipment E101 enters the spraying cavity E214 via the cooking fume inlet pipe E213, then enters the area between the box body E204 and the spraying cavity E214 from the through opening E2141 and finally is exhausted into the sealed cooking cavity E100 from the first cooking fume outlet E202. In the spraying cavity E214, a cooking fume spraying channel which is arranged in an extending manner is formed between one end of the cooking fume inlet pipe E213 and the through opening E2141, thus, the flowing path of the cooking fume entering the spraying cavity E214 becomes longer, and condensation and filtering of the cooking fume are better facilitated. At least one cooking fume filtering layer is arranged in the cooking fume spraying channel, and the at least one refrigeration sheet E2071 is arranged in the spraying cavity E214 and is distributed right above the cooking fume spraying channel. In addition, the bottom portion of each section of the cooking fume spraying channel is communicated with the through opening E2141, so that water sprayed into the cooking fume spraying channel E2142 from the spraying holes of the spraying partition plate E211 can be discharged to the bottom portion of the box body E204 from the through opening E2141.

The first longitudinal partition plate E216 is longitudinally arranged between the spraying partition plate E211 and the bottom portion of the box body E204, so that the area between the spraying partition plate E211 and the bottom portion of the box body E204 is divided into two parts, and a cooking fume channel opening E2048 is formed between the bottom portion of the first longitudinal partition plate E216 and the bottom portion of the box body E204. The transverse partition plate E215 is located between the spraying plate partition plate E211 and the bottom portion of the box body E204 and transversely arranged between the first longitudinal partition plate E216 and one side wall, opposite to the first longitudinal partition plate E216, of the box body E204, so that the spraying cavity E214 is defined by the transverse partition plate E215, the first longitudinal partition plate E216, the spraying partition plate E211 and the corresponding side walls of the box body E204.

The second longitudinal partition plate E217 is longitudinally arranged between the first longitudinal partition plate E216 and the side wall opposite to the box body E204, the top portion of the second longitudinal partition plate E217 is connected with the bottom portion of the spraying partition plate E211 in a sealed manner, and the bottom portion of the second longitudinal partition plate E217 is spaced from the top portion of the transverse partition plate E215. The third longitudinal partition plate E218 is longitudinally arranged between the second longitudinal partition plate E217 and the side wall, the top portion of the third longitudinal partition plate E218 is spaced from the bottom portion of the spraying partition plate E211, and the bottom portion of the third longitudinal partition plate E218 is fixed to the top portion of the transverse partition plate E215. In this way, cooking fume exhausted by the cooking fume inlet pipe E213 which is located between the first longitudinal partition plate E216 and the second longitudinal partition plate E217 can firstly pass through an area between the first longitudinal partition plate E216 and the second longitudinal partition plate E217 and then pass through an area between the second longitudinal partition plate E217 and the third longitudinal partition plate E218, and finally, the cooking fume passes through an area between the third longitudinal partition plate E218 and the side wall of the box body E204, so that the path of the cooking fume passing through the box body E204 is prolonged. Besides, the first cooking fume outlet E202 is formed in the other side wall, opposite to the first longitudinal partition plate E216, of the box body E204 and located below the spraying partition plate E211, the through opening E2141 is formed in the transverse partition plate E215 and located between the third longitudinal partition plate E218 and the side wall, adjacent and opposite to third longitudinal partition plate E218, of the box body E204, so that the cooking fume entering the spraying cavity E214 can be discharged to an area between the transverse partition plate E215 and the bottom portion of the box body E204 from the through opening E2141, and then is discharged out from the cooking fume channel opening E2048 and the first cooking fume outlet E202 in sequence. Therefore, the partition plate is arranged in the box body E204, so that the passing path of the cooking fume entering the box body E204 can be lengthened, and the condensation and filtration of the cooking fume are facilitated. In order to enable water sprayed between the second longitudinal partition plate E217 and the third longitudinal partition plate E218 to smoothly flow to the through opening E2141, a gap opening E2181 is formed between the bottom portion of the third partition plate E218 and the transverse partition plate E215.

One end of the draining pipe E219 is connected with a draining port E2043 of the box body E204 so as to drain oil liquid at the bottom portion of the box body E204. Preferably, a drain valve (not shown) is arranged on the draining pipe E219. The water outlet end of the water level limiting water outlet E2044 penetrates through the bottom portion of the box body E204 and is located below the transverse partition plate E215 and higher than the bottom portion of the box body E204.

Cooking fume filtering layers are arranged in the first filtering box E221 and the second filtering box E222 and can be made of materials which have good adsorption capacity on cooking fume and good heat conductivity, for example, steel wire balls or metal wire meshes arranged in a stacked manner and the like, which is not specifically limited herein.

The first filtering box E221 is provided with a cooking fume inlet E2211, a cooking fume outlet E2212 and a spraying water inlet E2213. The second filtering box E222 is connected with the first cooking fume outlet E202 of the box body E204 via the fan E205 and is connected with the cooking fume inlet E2211 of the first filtering box E221 via the cooking fume outlet pipe E220.

The cooking fume outlet E2212 is formed in the bottom portion of the first filtering box E221, and the spraying water inlet E2213 is formed in the top portion of the first filtering box E221. The cooking fume outlet E2212 of the first filtering box E221 is communicated with the sealed cooking cavity E100. The water outlet end of the draining pipe E219 is connected with the spraying water inlet E2213 of the first filtering box E221, so that water is drained into the first filtering box E221 through the draining pipe E219 when needed to reduce the temperature of the first filtering box E221, and the cooking fume is further purified.

It should be noted that the spraying water inlet E2213 can also be connected with the water level limiting draining port E2044 via the draining pipe E219, and when the water level at the bottom portion of the box body E204 is higher than the water level limiting draining port E2044, water at the bottom portion of the box body E204 overflows from the water level limiting draining port E204 and enters the first filtering box E221, so that the temperature of the first filtering box E221 is reduced.

Compared with the prior art, the cooking fume treatment system for cooking machines has the advantages that the first cooking fume inlet E201 of the first cooking fume treatment device E200 is connected with the cooking equipment E101, and the first cooking fume outlet E202 is connected with the sealed cooking cavity F100, so that cooking fume treated by the first cooking fume treatment device E200 is discharged into the sealed cooking cavity F100; when the wok lid is separated from the wok, cooking fume in the sealed cooking cavity F100 enters the first cooking fume treatment device E200 from the first cooking fume inlet E201 to be purified, the cooking fume of the cooking machine is circularly purified, the cooking fume of the cooking machine does not need to be discharged into the environment, and the cooking fume is prevented from polluting the environment.

Example 6

Figure 14:
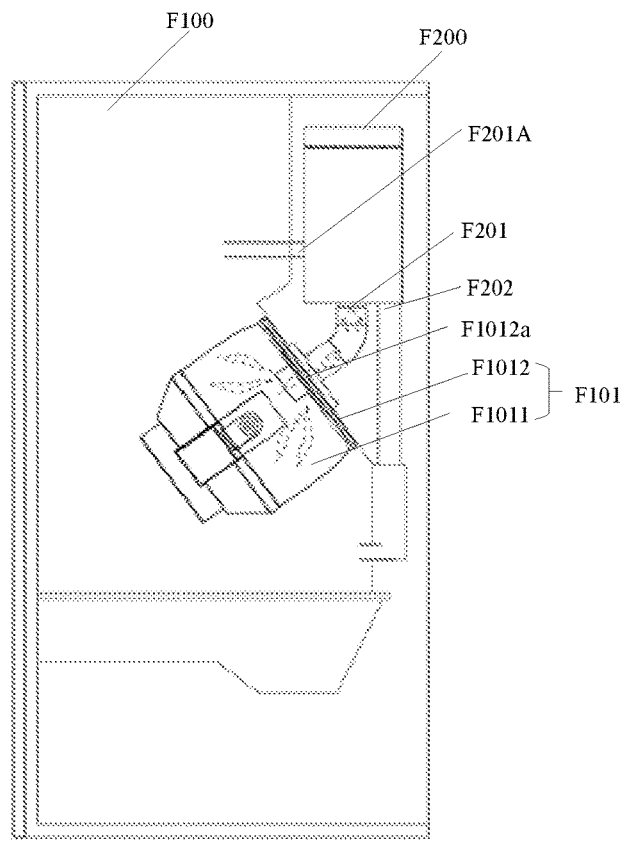
FIG. 14 is a structural schematic diagram of the cooking fume treatment system for cooking machines provided by the sixth embodiment of the invention.

Please refer to FIG. 14, which is a structural schematic diagram of the cooking fume treatment system for cooking machines in the sixth embodiment of the invention.

In the embodiment, the cooking fume treatment system for cooking machines comprises a sealed cooking cavity F100 and a first cooking fume treatment device F200.

Cooking equipment F101 is arranged in the sealed cooking cavity F100. The first cooking fume treatment device F200 is provided with a first cooking fume inlet F201, a second cooking fume inlet F201A and a first cooking fume outlet F202. The first cooking fume inlet F201 of the first cooking fume treatment device F200 is communicated with the cooking equipment F101, the second cooking fume inlet F201A is communicated with the sealed cooking cavity F100, and the first cooking fume outlet F202 of the first cooking fume treatment device F200 is communicated with the sealed cooking cavity F100.

In the embodiment, the cooking equipment F101 comprises a wok F1011 and a wok lid F1012, and the wok lid F1012 is matched with a wok opening of the wok F1011 so as to close or open the wok F1011; an air outlet hole F1012a is formed in the wok lid F1012, and the first cooking fume inlet F201 of the first cooking fume treatment device F200 is in sealed connection with the air outlet hole F1012a via a cooking fume inlet pipe so as to be communicated with the cooking equipment F101.

In the embodiment, the cooking fume in the sealed cooking cavity F100 and the cooking fume in the cooking equipment F101 respectively enter the first cooking fume treatment device F200 from the second cooking fume inlet F201A and the first cooking fume inlet F201 to be purified, and the cooking fume purified by the first cooking fume treatment device F200 returns to the sealed cooking cavity F100 from the first cooking fume outlet F202 to be subjected to circulating cooking fume treatment, and therefore achieving zero emission of cooking fume of the cooking machine.

Figure 15:
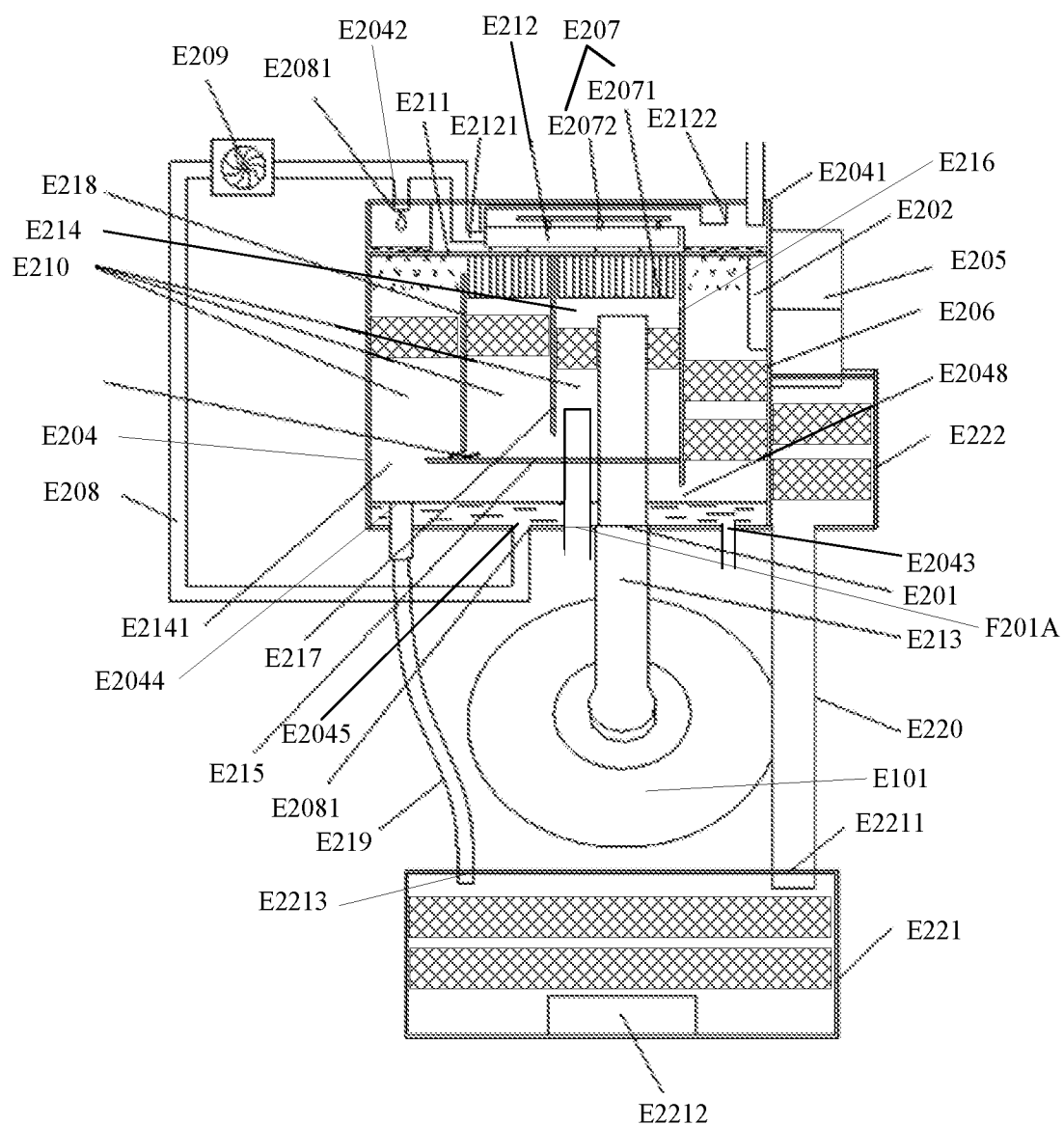
FIG. 15 is a structural schematic diagram of the cooking fume treatment device provided by the sixth embodiment of the invention.

Please refer to FIG. 15, which is a structural schematic diagram of the cooking fume treatment device in the sixth embodiment of the invention.

In this embodiment, the first cooking fume treatment device F200 differs from the cooking fume treatment device of the fifth embodiment in that:

The first cooking fume treatment device F200 is further provided with a second cooking fume inlet F201A, and the second cooking fume inlet F201A is communicated with the sealed cooking cavity F100.

It needs to be noted that the second cooking fume inlet F201A can be formed in the cooking fume inlet pipe E213 and communicates with the sealed cooking cavity F100 through a fume guiding pipe; in addition, the second cooking fume inlet F201A may also be provided on the box body E204, which is not specifically limited herein.

Besides, the structure of the first cooking fume treatment device F200 in the embodiment is only an example, and the cooking fume treatment device F200 can be the same as the cooking fume treatment device in the embodiment in structure and can also be a cooking fume treatment device with other structures, which is not specifically limited herein.

Compared with the prior art, the cooking fume treatment system for cooking machines provided by the embodiment of the invention has the advantages that the first cooking fume inlet F201 and the second cooking fume inlet F201A of the first cooking fume treatment device F200 are respectively connected with the cooking equipment F101 and the sealed cooking cavity F100, and the first cooking fume outlet F202 of the first cooking fume treatment device F200 is connected with the sealed cooking cavity F100, so that the cooking fume of the sealed cooking cavity F100 and the cooking equipment F101 is treated by the first cooking fume treatment device F200 and then is discharged into the sealed cooking cavity F100 for circular treatment, and the cooking fume does not need to be discharged into the environment; also, most of the cooking fume circularly treated by the first cooking fume treatment device F200 is converted into liquid to be discharged out of the sealed cooking cavity F100, so that the cooking fume of the cooking machine can be prevented from polluting the environment.

Example 7

Figure 16:
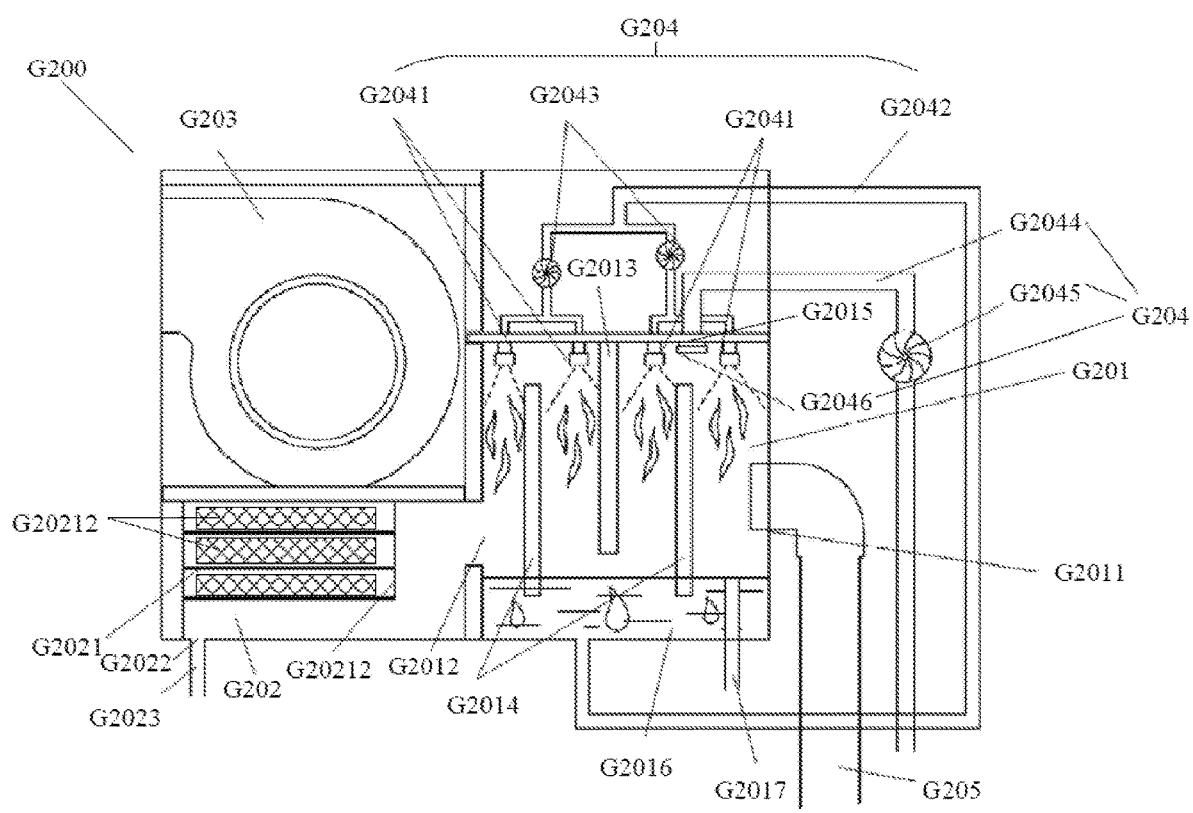
FIG. 16 is a structural schematic diagram of the cooking fume treatment device provided by the seventh embodiment of the invention.

Please refer to FIG. 16, which is a structural schematic diagram of the cooking fume treatment device in the seventh embodiment of the invention.

In the embodiment, the cooking fume treatment device G200 comprises a spraying chamber G201, a filtering chamber G202, a fan G203, a pipeline mechanism G204 and a cooking fume inlet pipe G205.

The spraying chamber G201 comprises a cooking fume inlet G2011, a spraying chamber outlet G2012, an upper partition plate G2013, a lower partition plate G2014 and a water inlet G2015. In the embodiment, the number of the upper partition plates G2013 is one, the number of the lower partition plates G2014 is two, in other cases, the number of the upper partition plates G2013 and the number of the lower partition plates G2014 can be larger or smaller, and the beneficial effects achieved by the invention are not affected.

A filter G2021 is arranged in the filtering chamber G202. An inlet of the filtering chamber G202 is communicated with the spray chamber outlet G2012, an outlet of the filtering chamber G202 is communicated with an air inlet of the fan G203, and an air outlet of the fan G203 is communicated with the outside or a sealed cooking cavity of a cooking machine.

It needs to be noted that in the embodiment, the air outlet of the draught fan G203 is used as the cooking fume outlet of the cooking fume treatment device.

It needs to be noted that the number of the cooking fume inlets G2011 of the cooking fume treatment device G200 in the embodiment may be two, and the two cooking fume inlets G2011 respectively communicate with the cooking equipment in the sealed cooking cavity and the sealed cooking cavity described in the above embodiments.

The pipeline mechanism G204 comprises a circulating sprayer G2041, a water spraying connecting pipe G2042 and a circulating water pump G2043. In the embodiment, the cooking fume treatment device G200 comprises four circulating sprayers G2041, in other cases, the number of the sprayers G2041 included in the cooking fume treatment device can be larger or smaller, and the beneficial effects obtained by the cooking fume treatment device are not affected.

In the embodiment, the cooking fume inlet G2011 is formed in one side wall of the spraying chamber G201, and one end of the cooking fume inlet pipe G205 penetrates through the cooking fume inlet G2011 in a sealed manner so as to guide cooking fume into the spraying chamber G201; the upper partition plates G2013 and the lower partition plates G2014 are vertically and alternately distributed in the spraying chamber G201, the upper ends of the upper partition plates G2013 are installed at the top portion of the spraying chamber G201, and the lower ends of the upper partition plates G2013 are spaced from the bottom portion of the spraying chamber G201. The lower partition plate G2014 is arranged between the top portion and the bottom portion of the spraying chamber G201 and is spaced from the top portion and the bottom portion of the spraying chamber G201, so that the inner space of the spraying chamber G201 is divided into a plurality of spraying areas which are sequentially connected end-to-end to form a multi-bend flue, the path of cooking fume in the spraying chamber G201 is prolonged, and the spraying and filtering effects are enhanced.

In the embodiment, a water storage tank G2016 and an overflow opening G2017 are formed in the bottom portion of the spraying chamber G201. The water storage liquid level of the water storage tank G2016 is higher than the bottom end of the lower partition plate G2014 and lower than the bottom end of the upper partition plate G2013. The water outlet end of the overflow opening G2017 is higher than the bottom end of the lower partition plate G2014 and lower than the bottom end of the upper partition plate G2013, so that the liquid level of the water storage tank G2016 is maintained.

One upper partition plate G2013 and two lower partition plates G2014 divide the spraying chamber G201 into a first-stage spraying area, a second-stage spraying area, a third-stage spraying area and a last-stage spraying area, the cooking fume inlet G2011 is formed in the first-stage spraying area, the spraying chamber outlet G2012 is formed in the last-stage spraying area, and the height of the spraying chamber outlet G2012 is higher than the water storage liquid level of the water storage tank G2016.

In the embodiment, the four circulating sprayers G2041 are respectively arranged at the top portion of the first-stage spraying area, the top portion of the second-stage spraying area, the top portion of the third-stage spraying area and the top portion of the last-stage spraying area, and the circulating sprayers G2041 are connected with the water spraying connecting pipe G2042. The water spraying connecting pipe G2042 is connected to the bottom portion of the water storage tank G2015 and connected with the circulating water pump, so that spraying water can be circularly used for spraying, and the water consumption of spraying operation is saved.

Preferably, the pipeline mechanism G204 further comprises a water inlet pipe G2044, a water inlet pump G2045 and a water inlet sprayer G2046. One end of the water inlet pipe G2044 penetrates through a water inlet G2015 of the spraying chamber G201 and is connected with the water inlet sprayer G2046, the water inlet pump G2045 is arranged on the water inlet pipe G2044, and the other end of the water inlet pipe G2044 is connected with an external water source so that sufficient water can be provided for the water storage tank G2016 for circulating spraying.

In the embodiment, the filter G2021 comprises a plurality of filtering screens G20211 and a filtering screen frame G20212. The filtering screen frame G20212 is of a layered structure, an opening is formed in the middle of each layer, and the filtering screens G20211 are respectively installed on the openings so that the filtering screens G20211 can be cleaned and replaced conveniently, and the interior of the cooking fume treatment device can be kept clean. Preferably, a liquid discharging pipe opening G2022 and a liquid discharging pipe G2023 connected with the liquid discharging pipe opening G2022 are arranged at the bottom portion of the filtering chamber G202.

In the embodiment, the filtering screens G20211 are all metal filtering screens, in other cases, the filtering screens G20211 can also be activated carbon filtering screens or gauze filtering screens and the like, the multiple filtering screens G20211 can be made of the same or different materials, and the beneficial effects obtained by the invention are not influenced.

The working process of the cooking fume treatment device disclosed by the embodiment is as follows:

The water inlet pump G2045 is started to pump water of an external water source, and the water is sprayed out by the water inlet sprayer G2046 through the water inlet pipe G2044 and flows into the water storage tank G2016 located at the bottom portion of the spraying chamber G201. And the fan G203 is started, so that airflow from the first-stage spraying area to the last-stage spraying area is formed in the spraying chamber G201, and the airflow enters the filtering chamber G202 from the spraying chamber G201 and is finally discharged out of the cooking fume treatment device through the fan G203.

Cooking fume enters the first-stage spraying area from the cooking fume inlet G2011, the water inlet sprayer G2046 sprays and cools the cooking fume, most cooking fume particles are separated from gas, and most cooking fume particles are absorbed by water and dissolved in the accumulated water of the water storage tank G2016.

The circulating water pump G2043 pumps the accumulated water in the water storage tank G2016, the accumulated water passes through the water spraying connecting pipe G2042 and is sprayed out of the circulating sprayer G2041 to cool cooking fume in the secondary spraying area, some of the cooking fume particles are filtered out by the filtering screen in the secondary spraying area, and some of the cooking fume particles fall to the bottom portion of the spraying chamber G201 and flow into the water storage tank G2016 from a gap between the lower partition plate G2014 and the bottom portion of the spraying chamber G201 along with spraying water, the rest of the cooking fume particles enter the next spraying area along with airflow, and the process is repeated in the next spraying area. The residual cooking fume particles enter the filtering chamber G202 from the spray chamber outlet G2012 along with the airflow, rise from the bottom portion of the filter G20211 along with the airflow, are blocked by the filtering screens G20211 and are condensed and liquefied to form cooking fume condensate, the cooking fume condensate flows out of the cooking fume treatment device through the liquid discharge pipe G2023, and finally, the clean gas subjected to spraying and filtering treatment is discharged to the outside of the cooking fume treatment device from an air outlet of the fan G203.

According to the cooking fume treatment device provided by the embodiment of the invention, the fan G203 generates the guide airflow in the cooking fume treatment device, cooking fume passing through the spraying chamber G201 is subjected to spraying and cooling through the pipeline mechanism G204, cooking fume particles are absorbed at the same time, and the interior of the spraying chamber G201 is divided into the multiple bent air flues, so that the cooling and absorbing effects on the cooking fume particles are enhanced, and then the residual cooking fume particles are filtered by the filtering chamber G202, so that the treated gas is clean and can be discharged, the residues of cooking fume in the cooking fume treatment device are reduced, the cooking fume is rapidly treated, the separation efficiency of the cooking fume particles and the gas in the cooking fume is improved, and cost of cooking fume treatment is reduced.

It can be understood that the first cooking fume treatment device or the second cooking fume treatment device in the cooking fume treatment system for cooking machines disclosed by the above embodiments of the invention can adopt the structure of the cooking fume treatment device disclosed by the seventh embodiment.

Example 8

Figure 17:
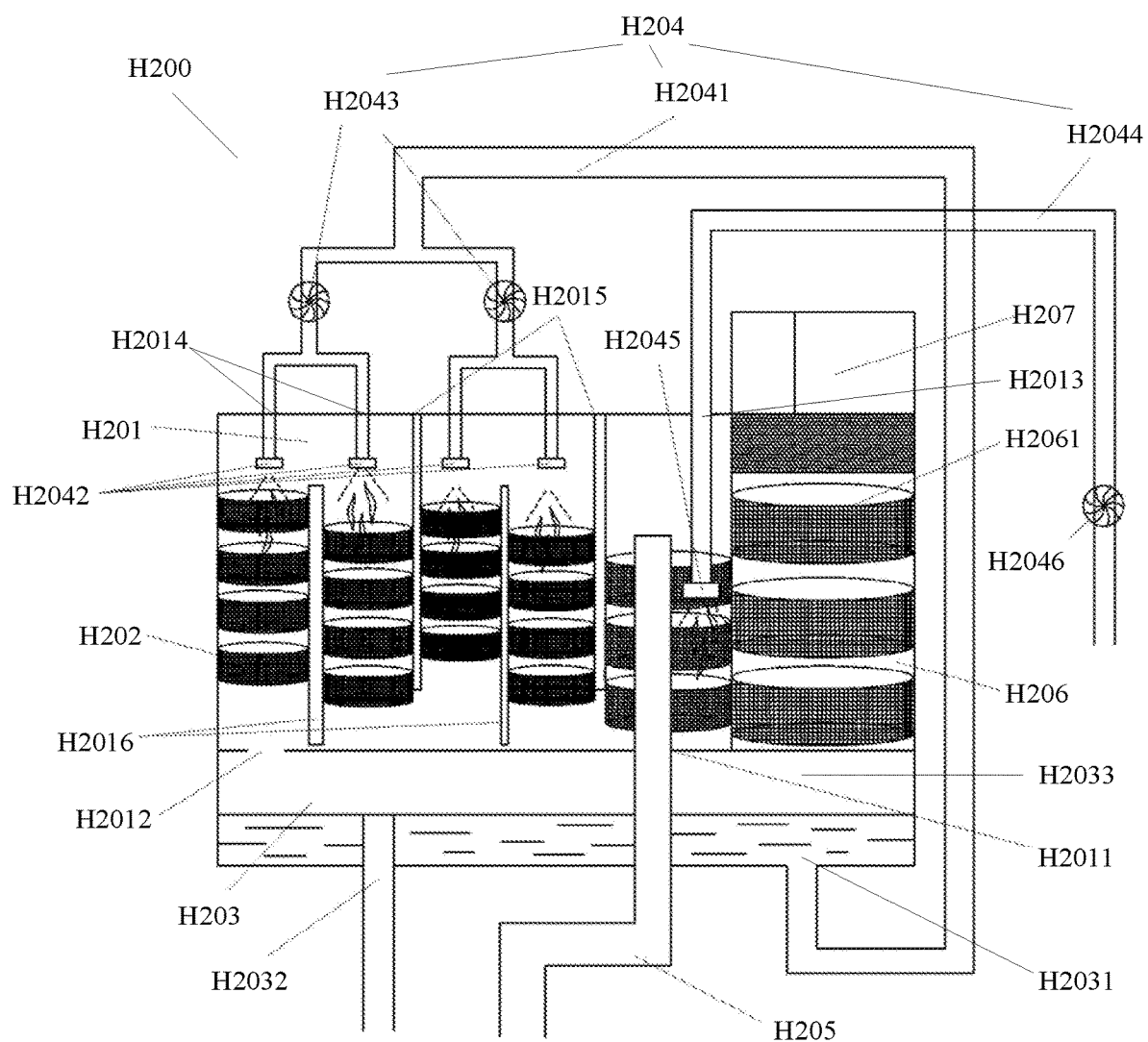
FIG. 17 is a structural schematic diagram of the cooking fume treatment device provided by the eighth embodiment of the invention.
Figure 18:
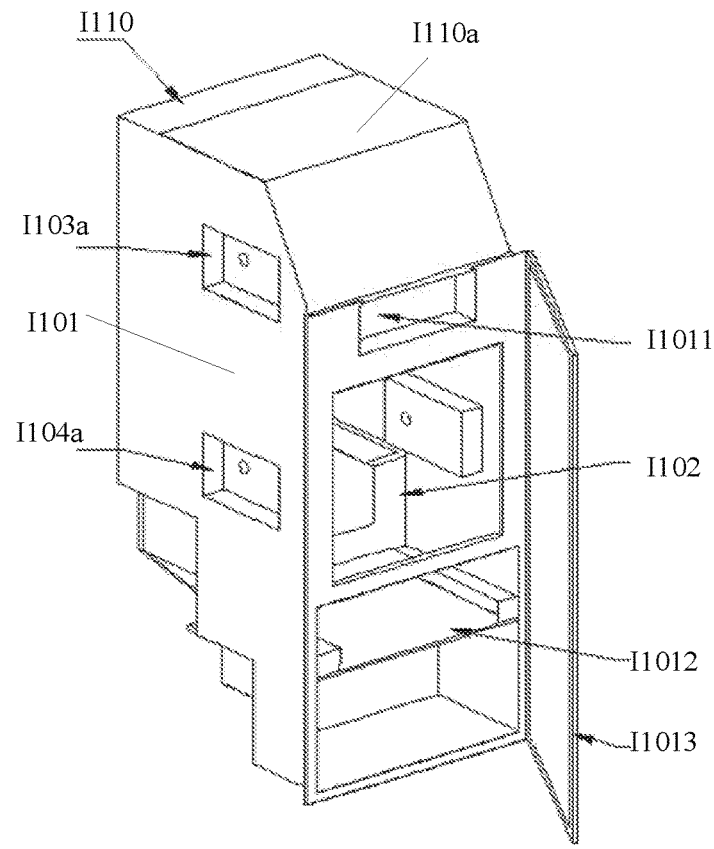
FIG. 18 is a front schematic view of a sealed cooking cavity according to a ninth embodiment of the present invention.
Figure 19:
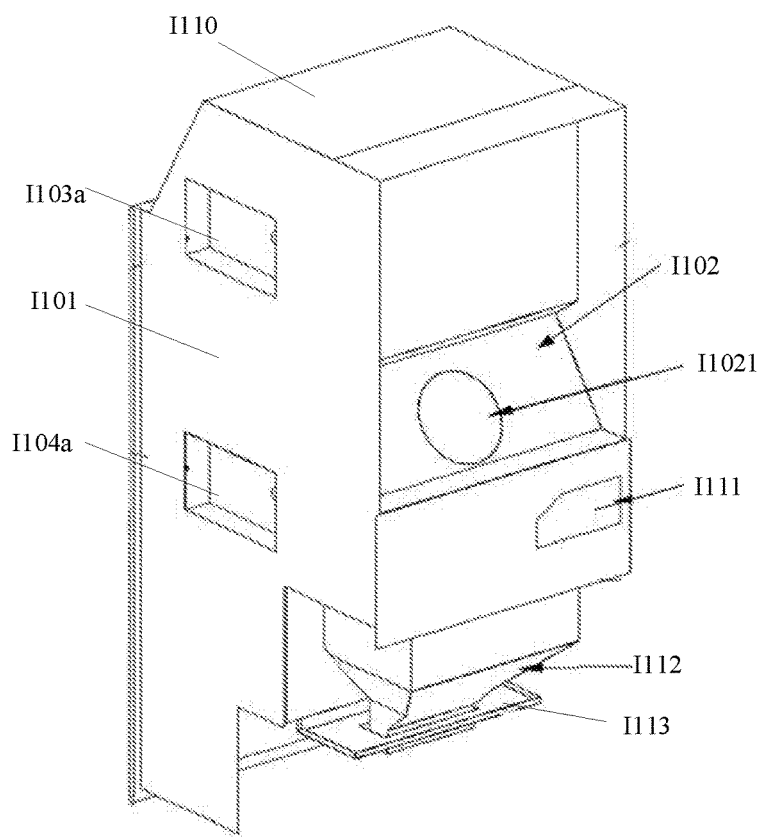
FIG. 19 is a rear schematic view of a sealed cooking cavity according to a ninth embodiment of the present invention.

Please refer to FIG. 17, which is a structural schematic diagram of the cooking fume treatment device in the eighth embodiment of the invention.

In the embodiment, the cooking fume treatment device H200 comprises a spraying chamber H201, a plurality of filtering screens H202, a water storage chamber H203, a pipeline mechanism H204, a cooking fume inlet pipe H205, a filtering chamber H206 and a fan H207.

A cooking fume inlet H2011 and a spraying chamber outlet H2012 are formed in the spraying chamber H201, and a cooking fume channel communicated with the cooking fume inlet H2011 and the spraying chamber outlet H2012 is formed in the spraying chamber H201; a main water inlet H2013 and at least one circulating water inlet H2014 are formed in the top portion of the spraying chamber H201.

The plurality of filtering screens H2O2 are arranged in the cooking fume channel so as to filter cooking fume in the cooking fume channel.

The water storage chamber H203 is arranged below the spraying chamber H201 and is communicated with the spraying chamber outlet H2012. At least one circulating water outlet H2031 and a water level limiting water outlet H2032 are formed in the bottom portion of the water storage chamber H203, and a cooking fume outlet channel H2033 is formed between the water storage chamber H203 and the spraying chamber H201.

The pipeline mechanism H204 comprises a water spraying connecting pipe H2041, a plurality of circulating sprayers H2042, a water spraying pump H2043, a water inlet pipeline H2044, a water inlet sprayer H2045 and a water inlet pump H2046. The water spraying connecting pipe H2041 comprises at least one water outlet and at least one water inlet, each water outlet correspondingly penetrates through the corresponding circulating water inlet H2014 and is connected with the corresponding circulating sprayer H2042, each water inlet is connected with the corresponding circulating water outlet H2031, and the water spraying pump H2043 is arranged in the water spraying connecting pipe H2041. The water outlet end of the water inlet pipeline H2044 penetrates through the main water inlet H2013 and is connected with the water inlet sprayer H2045, the water inlet end of the water inlet pipeline H2044 is connected with an external water source, and the water inlet pump H2046 is arranged in the water inlet pipeline H2044.

The cooking fume inlet H2011 is formed in the bottom portion of the spraying chamber H201, and the cooking fume inlet pipe H205 penetrates through the cooking fume inlet H2011 so that cooking fume can be discharged into the spraying chamber H201.

An inlet of the filtering chamber H206 is communicated with a cooking fume outlet channel H2033 of the water storage chamber H203, a plurality of second filtering screens H2061 such as the filtering screens H202 are arranged in the filtering chamber H206, and an outlet of the filtering chamber H206 is connected with an air inlet of the fan H207.

In the embodiment, the air outlet of the fan H207 is used as the cooking fume outlet of the cooking fume treatment device.

In the embodiment, the filtering screen H202 and the second filtering screen H2061 are both metal filtering screens, in other cases, the filtering screen H202 and the second filtering screen H2061 can also be activated carbon filtering screens or gauze filtering screens and the like; also, the multiple filtering screens H202 can be made of the same or different materials, the plurality of second filtering screens H2061 can be the same or different, and the beneficial effects obtained by the invention are not influenced.

Preferably, a plurality of upper partition plates H2015 and a plurality of lower partition plates H2016 are arranged in the spraying chamber H201. The upper partition plates H2015 and the lower partition plates H2016 are vertically and alternately distributed, the upper end of each upper partition plate H2015 is installed at the top portion of the spraying chamber H201, the lower end of each upper partition plate H2015 is spaced from the bottom portion of the spraying chamber H201, the lower partition plates H2016 are arranged between the top portion and the bottom portion of the spraying chamber H201, the upper end of each lower partition plate H2016 is spaced from the top portion of the spraying chamber H201, and the lower end of each lower partition plate H2016 is attached to the bottom portion of the spraying chamber H201 in the manner that a gap is reserved therebetween, so that the inner space of the spraying chamber H201 is divided into a plurality of spraying areas which are sequentially connected end-to-end to form a multi-bend flue, the path of cooking fume in the spraying chamber H201 is prolonged, and the spraying and filtering effect is enhanced.

In the embodiment, the number of the upper partition plates H2015 is two, and the number of the lower partition plates H2016 is two. The two upper partition plates H2015 and the two lower partition plates H2016 divide the spraying chamber H201 into a first-stage spraying area, a second-stage spraying area, a third-stage spraying area, a fourth-stage spraying area and a last-stage spraying area. The cooking fume inlet H2011 is formed in the bottom portion of the first-stage spraying area, and the spraying chamber outlet H2012 is formed in the last-stage spraying area. In other cases, the cooking fume treatment device can also comprise more or fewer upper partition plates H2015 and also can comprise more or fewer lower partition plates H2016, and the beneficial effects obtained by the cooking fume treatment device are not influenced. Preferably, each filtering screen H2O2 is circular and is detachably and vertically distributed in the multiple spraying areas, and the situation that the flue is blocked due to the fact that cooking fume is deposited on the filtering screens H2O2 is prevented while the cooking fume is filtered.

In the embodiment, the number of the circulating sprayers H2042 is four, and the four circulating sprayers H2042 are respectively arranged at the top portion of the secondary spraying area, the top portion of the third-stage spraying area, the top portion of the fourth-stage spraying area and the top portion of the last-stage spraying area, and the circulating sprayers H2042 are connected with the water spraying connecting pipe H2042.

The main water inlet H2013 is formed in the top portion of the first-stage spraying area, and the water outlet end of the water inlet pipeline H2044 penetrates through the main water inlet H2013 and is located in the first-stage spraying area. The cooking fume inlet end of the cooking fume inlet pipe H205 penetrates through the cooking fume inlet H2011 and is located in the first-stage spraying area, and the height of the cooking fume inlet end of the cooking fume inlet pipe H205 is higher than that of the water outlet end of the water inlet pipeline H2044.

It needs to be noted that the number of the cooking fume inlets H2011 of the cooking fume treatment device H200 in the embodiment may be two, and the two cooking fume inlets H2011 are respectively communicated with the cooking equipment in the sealed cooking cavity and the sealed cooking cavity described in the above embodiment.

The working process of the cooking fume treatment device provided by the embodiment is described in detail below in combination with FIG. 17.

The water inlet pump H2046 is started to pump water of an external water source, the water is sprayed out by the water inlet sprayer H2045 through the water inlet pipeline H2044, flows to the spraying chamber outlet H2012 from a gap between the lower partition plate H2016 and the bottom portion of the spraying chamber H201 and enters the water storage chamber H203, and the gap between the lower partition plate H2016 and the bottom portion of the spraying chamber H201 is filled with water, so that cooking fume is prevented from escaping from the gap.

The fan H207 is started, so that air flow from the first-stage spraying area to the last-stage spraying area is formed in the spraying chamber H201, air flow from an inlet of the water storage chamber H203 to an outlet of the water storage chamber 2H03 is formed in the water storage chamber H203, and air flow from an inlet of the filtering chamber H206 to an outlet of the filtering chamber H206 is formed in the filtering chamber H206. Therefore, air flow which sequentially passes through the spraying chamber H201, the water storage chamber H203, the filtering chamber H206 and the fan H207 and finally is exhausted out of the cooking fume treatment device is formed in the cooking fume treatment device.

Cooking fume enters the first-stage spraying area from the cooking fume inlet pipe H205, the water inlet sprayer H2045 sprays and cools the cooking fume, some of the cooking fume particles are filtered by the filtering screen H202 in the first-stage spraying area, some of the cooking fume particles fall to the bottom portion of the spraying chamber H201 and flow into the water storage chamber H203 from a gap between the lower partition plate H2016 and the bottom portion of the spraying chamber H201 along with spraying water, and other cooking fume particles enter the secondary spraying area along with air flow.

The water spraying pump H2043 pumps accumulated water in the water storage chamber H203, the accumulated water passes through the water spraying connecting pipe H2041 and is sprayed out by the circulating sprayer H2042 to cool cooking fume in the secondary spraying area, some of the cooking fume particles are filtered out by the filtering screen H202 in the secondary spraying area, and some of the cooking fume particles fall to the bottom portion of the spraying chamber H201 and flow into the water storage chamber H203 from the gap between the lower partition plate H2016 and the bottom portion of the spraying chamber H201 along with spraying water, the rest of the cooking fume particles enter the next spraying area along with airflow, and the process is repeated in the next spraying area. A small part of residual cooking fume particles after multiple times of spraying and filtering enter the water storage chamber H203 from the spraying chamber outlet H2012 along with airflow, are absorbed again by accumulated water in the water storage chamber H203, and are filtered again by the filtering screen H2061 of the filtering chamber H206, and the treated gas is discharged out of the cooking fume treatment device from an air outlet of the fan H207.

According to the cooking fume treatment device provided by the embodiment of the invention, the fan H207 guides airflow in the cooking fume treatment device, the pipeline mechanism H204 performs spraying and cooling on cooking fume passing through the spraying chamber H201 and absorbs cooking fume particles at the same time, some of the cooking fume particles are filtered by the filtering screens H2O2 in the spraying chamber H201, so that the treated gas is clean and can be discharged, the residue of the cooking fume in the cooking fume treatment device is reduced, the cooking fume is rapidly treated, the separation efficiency of cooking fume particles in the cooking fume and the gas is improved, and the cooking fume treatment cost is reduced.

It can be understood that the first cooking fume treatment device or the second cooking fume treatment device in the cooking fume treatment system for cooking machines disclosed by the above embodiments of the invention can adopt the structure of the cooking fume treatment device disclosed by the eighth embodiment.

Example 9

Please refer to FIGS. 18-21, which are respectively a front side schematic diagram and a rear side schematic diagram of the sealed cooking cavity and a structure schematic diagram of the cooking machine with the sealed cooking cavity provided by the ninth embodiment of the invention.

In the embodiment, the sealed cooking cavity I100 is formed by a first shell I101, and the first shell I101 is formed by splicing outer plates and is in a cuboid-like shape or a cube-like shape. A first partition plate 1102 divides the first shell I101 into the sealed cooking cavity I100 and a cooking fume treatment area I200.

In the embodiment, the sealed cooking cavity I100 is sequentially provided with a feeding area I103, a cooking area I104 and a dish discharging area I105 from top to bottom, the feeding area I103 is used for installing an ingredient feeding device I106, the cooking area I104 is used for installing cooking equipment I107, and the dish discharging area I105 is used for installing a dish discharging device I108. And the cooking fume treatment area I200 is used for installing a cooking fume treatment device I201.

In the embodiment, a cooking fume outlet I1021 communicated with the cooking fume treatment area I200 is formed in the first partition plate I102, so that a cooking fume inlet of the cooking fume treatment device I201 is communicated with cooking equipment I107 in the sealed cooking cavity I100 through the cooking fume outlet I1021. The cooking equipment I107 comprises a wok I1071 provided with a wok working position controlling mechanism I1070 and a wok lid I1072 provided with a movement control mechanism, the movement control mechanism of the wok lid I1072 comprises a bearing and a hollow wok lid shaft I1072a, the bearing is installed in the cooking fume outlet I1021 of the first partition plate I102 in a sealed manner, and specifically, sealed installation can be achieved by arranging a sealing ring on the cooking fume outlet I1021. One end of the wok lid shaft I1072a is communicated with an air outlet hole of the wok lid I1072, and the other end of the wok lid shaft I1072a is communicated with a cooking fume inlet of the cooking fume treatment device I201.

The ingredient feeding device 1106 in the embodiment comprises an ingredient chamber I1062 with an ingredient-dropping flipping mechanism I1061, and the ingredient-dropping flipping mechanism I1061 comprises ingredient chamber supporting frames (not shown) located on the two side walls of the ingredient chamber I1062.

In the embodiment, a cleaning area (not shown) used for installing an automatic cleaning device is arranged on a side of the cooking area I104 of the sealed cooking cavity I100 so as to automatically clean the wok I1071 installed in the cooking area I104.

Preferably, the space between the feeding area I103 and the cooking area I104, the space between the cooking area I104 and the dish discharging area I105 and the space between the cooking area I104 and the cleaning area of the sealed cooking cavity I100 are provided with a partition plate I109, and a connecting channel is formed in each inner partition plate I109, so that the ingredient feeding device I106 in the feeding area I103, the cooking equipment I107 in the cooking area I104 and the dish discharging device I108 in the dish discharging area I105 can cooperate with one another to complete the cooking process, and the automatic cleaning device in the cleaning area can automatically clean the wok of the cooking equipment I107.

In the embodiment, the first shell I101 is divided into the sealed cooking cavity I100 and the cooking fume treatment area I200 through the first partition plate I102, and the sealed cooking cavity I100 is divided into areas with different functions (specifically, the feeding area I103, the cooking area I104, the dish discharging area I105 and the cleaning area) through the inner partition plate I108; the devices with different functions in the application and cooking process can be orderly distributed and do not interfere with each other, and the maintenance of each device is facilitated.

In the embodiment, an outer plate on the front side or the rear side of the first shell I101 is provided with a feeding opening I1011 used for feeding of a user and a dish outlet I1012 used for discharging of dishes; a cover plate I1013 capable of being opened and closed is further arranged on the outer side of the outer plate provided with the feeding opening I1011 and the dish outlet I1012, and a self-suction type sealing strip is arranged at the juncture of the cover plate I1013 and the first shell I101 so as to avoid cooking fume leakage. When ingredient materials need to be fed or dishes need to be discharged, a user can open the cover plate I1013, the ingredient materials are fed or the dishes are discharged through the feeding opening I1011 or the dish outlet I1012, and after the ingredient materials are fed or the dishes are discharged, the cover plate I1013 is closed to enable the cooking area to be in a closed state.

Preferably, a maintenance opening I110 is formed in the top portion of the first shell I101, and a top plate I110a capable of being opened and closed is arranged on an outer plate of the maintenance opening I110. And when the interior of the cooking machine needs to be maintained, the top plate I110a can be opened for maintenance.

In the embodiment, two opposite side walls, corresponding to the feeding area I103, of the first shell I101 are each provided with a symmetrically-distributed protection box I103a of the ingredient-dropping flipping mechanism. Two opposite side walls, corresponding to the cooking area I104, of the first shell I101 are respectively provided with protection boxes I104a of the wok working position controlling mechanism which are symmetrically distributed; an protection box I111 of the automatic cleaning device is arranged at the position, opposite to the cleaning area, of the first shell I101 so as to prevent splashed water spots and the like in the cleaning process from damaging devices in the sealed cooking cavity I100. A draining device I112 and a waste-water channel I112a connected with the draining device I112 are arranged below the cleaning area, and a flow guiding plate I113 used for fixing the waste-water channel I112a is arranged on the first shell I101.

It should be noted that the cooking machine with the sealed cooking cavity I100 comprises a second shell I101a, and the first shell I101 is fixedly arranged in the second shell I101a. And a garbage processor I114 is arranged below the guiding plate I113 of the first shell I101.

Figure 21:
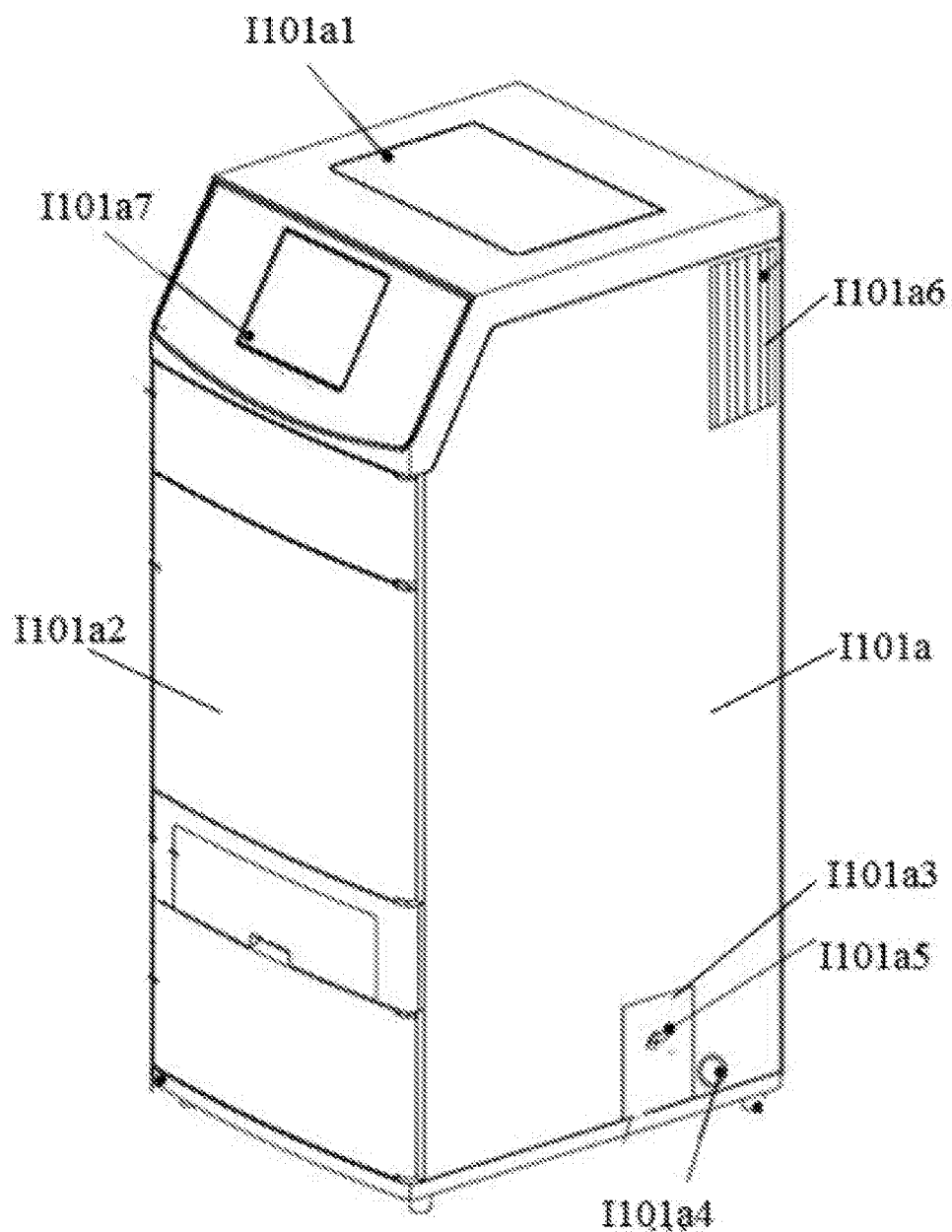
FIG. 21 is a schematic structure diagram of the second housing of the cooking machine according to the ninth embodiment of the invention.

Referring to FIG. 21, a second maintenance opening I101a1 is formed in the position, corresponding to the maintenance opening I110 of the first shell I101, of the top portion of the second shell I101a. And an opening I101a2 for opening and closing a cover plate I1013 of the first shell I101 is formed in the front part of the second shell I101a. A cleaning opening I101a3 and a draining opening I101a4 are formed in the side wall, opposite to the position below the cleaning area of the first shell I101, of the second shell I101a, an openable and closable cleaning door I101a5 is arranged on the cleaning opening I101a3, and when components below the sealed cooking cavity I100 need to be cleaned, the cleaning door I101a5 can be opened to clean the corresponding components. And a heat dissipation opening or/and a cooking fume outlet I101a6 is/are formed in the side wall, opposite to the cooking fume treatment area of the first shell I101, of the second shell I101a.

Besides, the first shell I101 and the second shell I101a form a box type structure, the lower half portion of the second shell I101a is of a square block structure, the upper half portion of the second shell I101a is of a halfpace-shaped structure, and a human-computer interaction interface installing position I101a7 is arranged on the inclined face of the halfpace-shaped structure. Therefore, the human-computer interaction interface of the cooking machine is arranged on the inclined plane of the halfpace-shaped structure, and a user can operate the human-computer interaction interface conveniently.

It needs to be noted that the first shell I101 can be provided with a cooking fume inlet hole or/and a cooking fume outlet hole so as to be connected with the first cooking fume treatment device or/and the second cooking fume treatment device, and therefore cooking fume purification and zero emission of cooking machine cooking fume are achieved to the maximum degree.

According to the embodiment, the first shell I101 and the first partition plate I102 are separated to form the sealed cooking cavity, the sealing ring is used for enhancing the sealing effect, and the inner partition plate I108 is used for dividing the sealed cooking cavity into a plurality of functional areas, so that devices with different functions applied to the cooking process can be orderly distributed and do not interfere with one another; maintenance of all devices is facilitated, the space is fully utilized, and the size of the cooking machine can be greatly reduced.

Obviously, the sealed cooking cavity in the cooking fume treatment system for cooking machines disclosed by the embodiments of the invention can be realized by adopting the structure of the sealed cooking cavity provided by the ninth embodiment. However, it can be understood that the sealed cooking cavity in the cooking fume treatment system for cooking machines disclosed by the embodiments of the invention can also adopt other structures, and the cooking fume treatment function of the cooking fume treatment system for cooking machines disclosed by the embodiments of the invention can be realized only by realizing sealed arrangement.

Example 10

Figure 22:
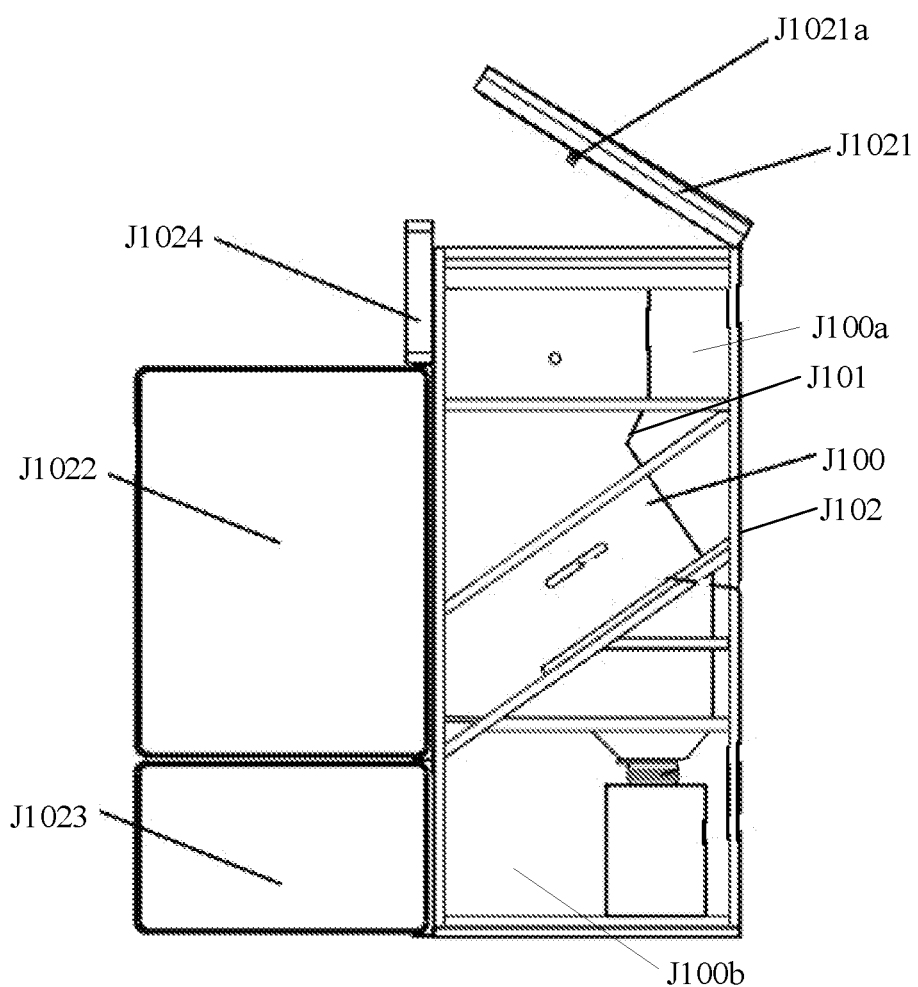
FIG. 22 is a schematic diagram of a structure of a sealed cooking chamber according to a tenth embodiment of the present invention.
Figure 23:
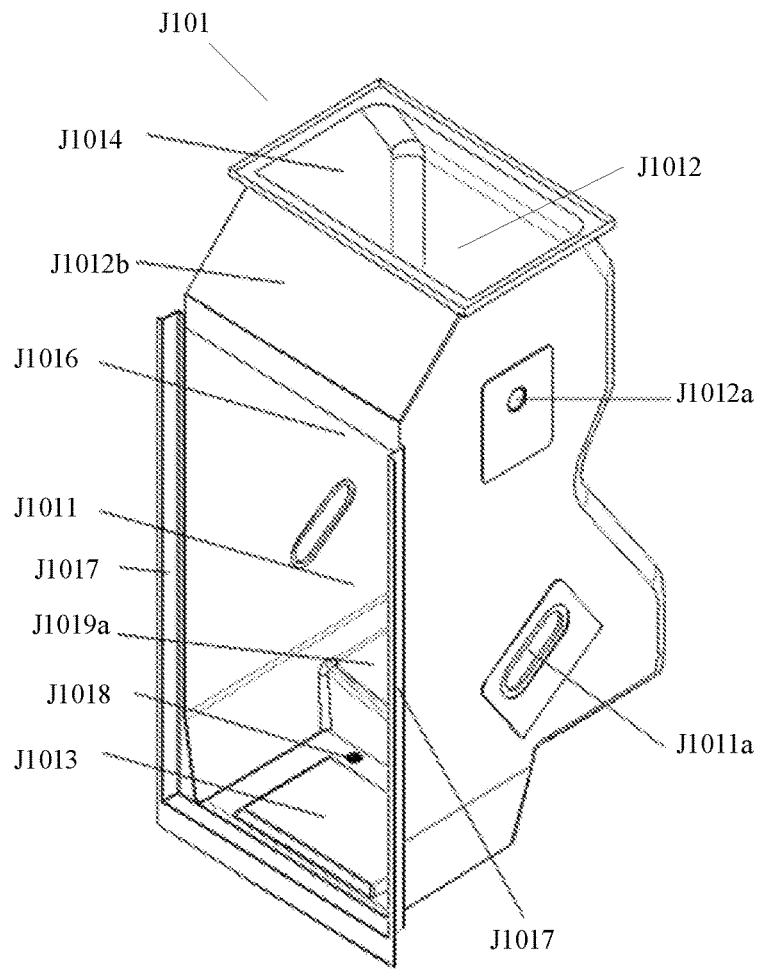
FIG. 23 is a perspective view of the inner shell of the tenth embodiment of the present invention.

Referring to FIG. 22, which is a schematic diagram showing the structure of the sealed cooking chamber provided by the tenth embodiment.

In the embodiment, the sealed cooking cavity J100 is formed by assembling an inner shell J101 and an outer shell J102. The inner shell J101 is arranged in the outer shell J102, and a cooking fume treatment area J100a and a seasoning adding area J100b are formed between the inner shell J101 and the outer shell J102. The cooking fume treatment area J100a is located on the outer side of the top portion of the inner shell J101, and the seasoning adding area J100b is located below the bottom portion of the inner shell J101.

The outer shell J102 is in a rectangle-like shape, a top cover door plate J1021 capable of being opened and closed is arranged at the top portion of the outer shell J102, a middle door plate J1022 is arranged in the middle portion of the front face of the outer shell J102, a seasoning door plate J1023 capable of being opened and closed is arranged on the lower portion of the front face of the outer shell J102, and an installation panel J1024 for installing a human-computer interface is arranged on the top portion of the front face of the outer shell J102.

Preferably, an ingredient feeding device flushing spraying head J1021a is arranged on the inner surface of the top cover door plate J1021 and used for cleaning an ingredient feeding device installed in the inner shell J101.

Please refer to FIGS. 23-26, which are a perspective view, a bottom view, a side view and a back view, respectively, of the inner shell J101 of the present embodiment.

In the embodiment, a cooking area J1011, a feeding area J1012 and a dish discharging area J1013 are arranged in the inner shell J101; the cooking area J1011 is located in the middle portion of the inner shell J101, the feeding area J1012 is located on the top portion of the inner shell J101, and the dish discharging area J1013 is located between the cooking area J1011 and the bottom portion of the inner shell J101. The cooking area J1011 is used for installing cooking equipment of the cooking machine, the feeding area J1012 is used for installing an ingredient feeding device of the cooking machine, and the dish discharging area J1013 is used for installing a dish discharging device. The cooking equipment comprises a wok, a wok lid, a wok rotating and working position controlling mechanism and a wok heating device. The wok lid is provided with an air outlet hole and a seasoning adding opening.

The top portion of the inner shell JJ101 is provided with a top cover opening J1014 used for installing a top cover door plate (not shown) capable of being opened and closed. When a device (such as a wok or a wok rotating or working position controlling mechanism) in the inner shell J101 needs to be maintained, the top cover door plate arranged at the top cover opening J1014 can be opened. Therefore, the top cover opening J1014 used for installing the top cover door plate is formed in the top portion of the shell J101, and devices in the cooking machine can be conveniently maintained.

A cooking fume outlet J1015 is formed in the side wall, opposite to the cooking area J1011, of the inner shell J101. A wok lid of the cooking equipment is arranged in the inner shell J101 opposite to the cooking fume outlet J1015, and a cooking fume outlet of the wok lid is communicated with the cooking fume outlet J1015 of the inner shell J101 in a sealed manner.

An installation opening J1016 used for installing the middle door plate J1022 capable of being opened and closed is formed in the face, opposite to the face provided with the cooking fume outlet J1015, of the inner shell J101, and a sealing strip J1017 is installed on the edge of the installation opening J1016. When the cooking equipment needs to be manually cleaned or a device in the inner shell J101 needs to be maintained, the middle door plate J1022 arranged at the installation opening J1016 can be opened. Besides, the sealing strip J1017 is arranged at the installation opening J1016, so that a gap between the middle door plate J1022 and the inner shell J101 can be better sealed when the middle door plate J1022 is closed, the inner shell J101 can have better sealing performance, and therefore, external sundries (such as dust) are prevented from entering the inner shell J101 easily, and cooking fume in the inner shell J101 is prevented from leaking outwards.

A first installing position J1011a for installing the wok working position controlling mechanism in the cooking area J1011 is arranged in the middle portion of each of two side walls, adjacent to the installing opening J1016, of the inner shell J101. Preferably, the first installing position J1011a can be a rotating shaft installing groove which is formed in each of the two side walls of the inner shell J101 and used for an installing rotating shaft of the wok working position controlling mechanism or an installing frame or an installing plate which is arranged on each of the two side walls of the inner shell J101 and used for installing the wok working position controlling mechanism and the like, which is not specifically limited herein.

The top portions, opposite to the feeding area J1012, of the two side walls, adjacent to the installing opening J1016, of the inner shell J101 are each provided with a second installing position J1012a used for installing the ingredient feeding device in the feeding area J1012. Preferably, the second installing position J1012a can be a feeding rotating shaft installing groove which is formed in each of the two side walls of the inner shell J101 and used for installing a rotating shaft of the ingredient feeding device. It needs to be noted that the second installing position J1012a can also be an installing frame or an installing plate or the like which is arranged on each of the two side walls of the inner shell J101 and used for installing the ingredient feeding device, which is not specifically limited herein.

A third installing position J1012b used for installing a human-computer interface installing device is arranged on the side wall, located over the installing opening J1016, of the inner shell J101. Preferably, the third installing position J1012b can be provided with an installing groove for accommodating the human-computer interface, an installing plate for installing the human-computer interface and the like, which is not specifically limited herein. Preferably, a certain angle is formed between the third installing position J1012b and the horizontal plane, so that a certain angle is formed between the human-computer interface mounted on the third installing position J1012b and the horizontal plane, and the use habit of a user is met.

In the embodiment, the bottom portion of the inner shell J101 is provided with a dish discharging area draining outlet J1018 and a draining channel structure J1019, the dish discharging area draining outlet J1018 and the draining channel structure J1019 are used for discharging sewage falling into the dish discharging area J1013. The draining channel structure J1019 is of a hollow structure, a sewage collecting opening J1019a is formed in the upper end of the draining channel structure J1019, and a draining opening J1019b is formed in the bottom end of the draining channel structure J1019. When sewage is accumulated to the bottom in the inner shell J101, the sewage at the bottom in the inner shell J101 can be discharged by the dish discharging area draining outlet J1018, so that the sanitation of the interior of the cooking machine is ensured. When the cooking equipment is cleaned, sewage falling from the cooking area flows into the draining channel structure J1019 from the sewage collecting opening J1019a through the dish discharging area sewage draining opening J1018 and is guided by the draining channel structure J1019 to the draining opening J1019b to be drained out. Therefore, by arranging the draining channel structure J1019 in the embodiment, sewage generated by cleaning the cooking equipment or liquefied oil liquid treated by the cooking fume treatment device can be conveniently discharged.

Preferably, the draining channel structure J1019 comprises a flow guide shell of a funnel-shaped structure, so that sewage falling from the cooking equipment can be conveniently guided out of the inner shell. It needs to be noted that the draining channel structure J1019 can also be of other structures, for example, the draining channel structure J1019 can be of a hollow cylinder structure, and the upper end and the lower end of the draining channel structure J1019 are provided with the sewage collecting opening J1019a and the draining opening J1019b respectively; or the draining channel structure J1019 can be a hollow inverted pyramid structure with the sewage collection port J1019a and the draining port J1019b formed in the upper end and the lower end respectively, which is not specifically limited herein.

Figure 20:
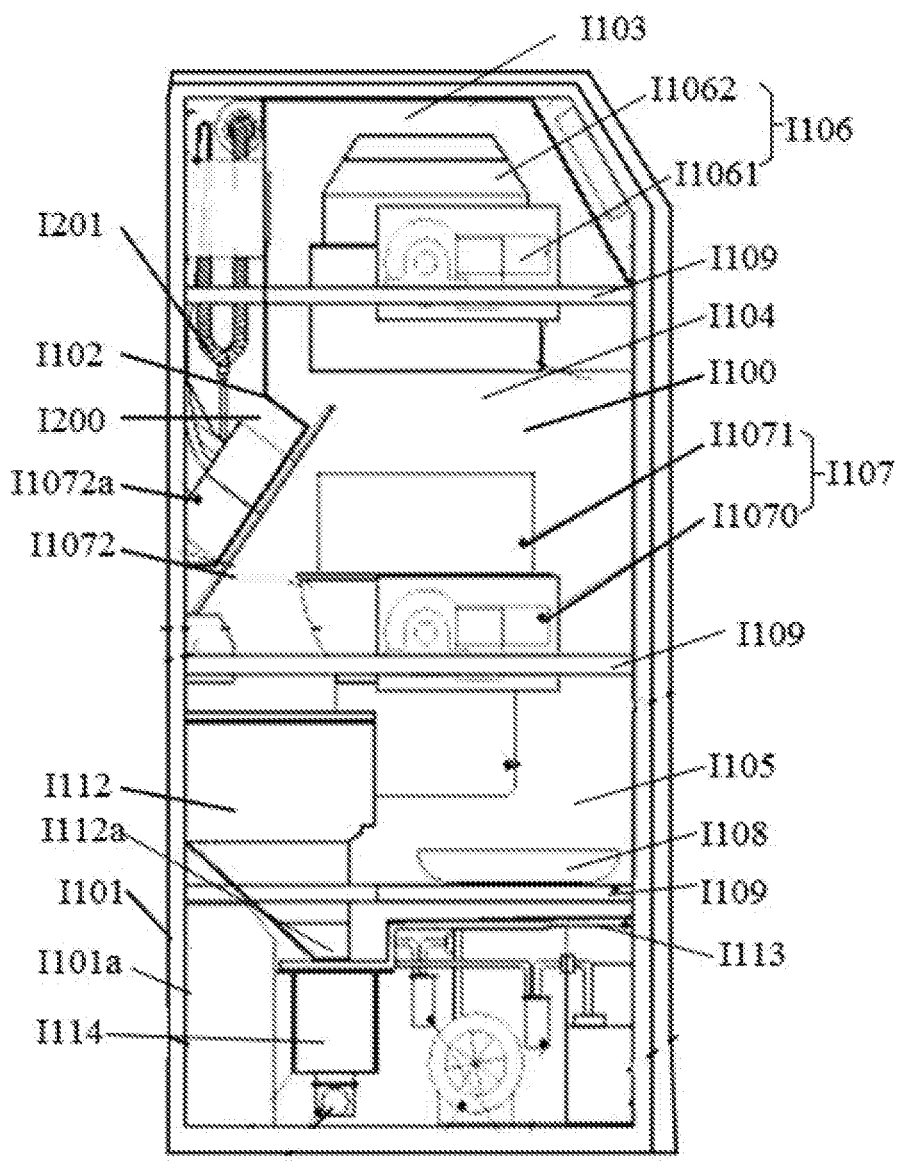
FIG. 20 is a schematic structure diagram of the cooking machine with the sealed cooking cavity according to the ninth embodiment of the invention.

Referring to FIG. 20, the bottom portion of the inner shell J101 is further provided with a water inlet pipe installing hole J1020 for a water inlet pipe (not shown) to penetrate into the inner shell J101, and the water inlet pipe penetrating into the inner shell J101 through the water inlet pipe installing hole J1020 is used for cleaning the cooking equipment.

It needs to be noted that the inner shell J101 can be provided with a cooking fume inlet hole or/and a cooking fume outlet hole so as to be connected with the first cooking fume treatment device or/and the second cooking fume treatment device, and therefore cooking fume purification and zero emission of cooking machine cooking fume are achieved to the maximum degree.

It needs to be noted that the wok rotating and working position controlling mechanism, the ingredient feeding device and the dish discharging device in the embodiment may be in the prior art, and the working principle of the wok rotating and working position controlling mechanism, the working principle of the feeding device and the working principle of the dish discharging device may refer to the following contents that food ingredients are placed in the ingredient feeding device, when the cooking machine starts a cooking procedure, a control device of the cooking machine controls the wok working position controlling mechanism to turn a wok until it face the ingredient feeding device, the control device controls the ingredient feeding device to throw food ingredients in the ingredient feeding device into the wok, and the control device controls a wok heating device of the cooking machine to heat the wok and a wok rotating mechanism to rotate the wok; after a preset cooking procedure is completed, the control device controls the wok working position controlling mechanism to turn the wok, so that food in the wok falls into a dish plate in the dish discharging area located below the wok, and therefore dish discharging is completed.

It needs to be noted that detection control elements (such as an electric part, a circuit, a power supply, a transmission line and a pipeline part, ect.) for realizing work of the ingredient feeding device, the cooking equipment and the seasoning device in a matched manner are arranged on the outer side of the inner shell J101, so that the detection control elements are prevented from being influenced by high-temperature, high-humidity and high-pH environments of a cooking area of the cooking machine; the ingredient feeding device, the cooking equipment, the seasoning device and the like are ensured to work durably and effectively, and the safety of cooked food is ensured.

It should be noted that the shape of the sealed cooking chamber J100 described above is only as an example, and that the sealed cooking chamber J100 may also be of other shapes, which is not specifically limited herein.

Compared with the prior art, the sealed cooking cavity disclosed by the embodiment of the present has the advantages that the inner space of the inner shell J101 is formed into a sealed cavity by assembling of the inner shell J101 and the outer shell J102, and the cooking fume treatment area J100a and the seasoning adding area J100b are formed between the inner shell J101 and the outer shell J102; cooking fume in the cooking equipment arranged in the closed cavity and cooking fume in the closed cavity can be discharged into the environment or continuously discharged into the closed cooking cavity for circular treatment only after entering a cooking fume treatment device arranged in the cooking fume treatment area J100a through the cooking fume outlet J1015 for treatment, so that zero emission of the cooking fume is realized, and the influence of cooking fume of the cooking machine on the environment is reduced.

Obviously, the sealed cooking cavity in the cooking fume treatment system for cooking machines disclosed by the embodiments of the invention can be realized by adopting the structure of the sealed cooking cavity provided by the embodiment 10. However, it can be understood that the sealed cooking cavity in the cooking fume treatment system for cooking machines disclosed by the embodiment of the invention can also adopt other structures, and the cooking fume treatment function of the cooking fume treatment system for cooking machines disclosed by the embodiment of the invention can be realized only by realizing sealed arrangement.

Example 11

Please refer to FIGS. 27-32, which show a structure of a cooking machine provided by the eleventh embodiment of the invention.

In the embodiment, the cooking machine comprises an inner shell K10, an outer shell K20, an ingredient feeding device K101, cooking equipment K102 and a dish discharging device K103, the ingredient feeding device K101, the cooking equipment K102 and the dish discharging device K103 are arranged in a sealed cooking cavity K100 formed by the inner shell K10 and the outer shell K20; and the auxiliary cooking equipment, such as the cooking fume treatment device K104 and the seasoning device K105, is arranged in a space area between the inner shell K10 and the outer shell K20 and used for assisting the ingredient feeding device K101, the cooking equipment K101 and the dish ingredient feeding device K101 in realizing a cooking function.

The structure of the inner shell K10 and the structure of the cooking fume treatment device K104 may be described with reference to the previous related embodiments and will not be described in detail herein.

In the embodiment, the ingredient feeding device K101 is installed on the top portion of the sealed cooking cavity K100, the cooking device K102 is arranged in the middle portion of the sealed cooking cavity K100, and the dish discharging device K103 is installed on the lower portion of the sealed cooking cavity K100.

The cooking equipment K102 comprises a wok lid K1021, a wok K1022, a wok rotating mechanism, a wok working position controlling device and a wok heating device (not shown). The wok lid K1021 is matched with a wok opening of the wok K1022 so as to close or open the wok K1022; the wok rotating mechanism is used for controlling the wok to rotate, the wok working position controlling device is used for driving the wok to turn to different working positions, and the wok heating device is used for heating the wok K1021. The wok lid K1021 is provided with an air outlet hole (not shown) and a seasoning adding opening (not shown).

The auxiliary cooking equipment comprises a wok lifting device K301, a wok working position conversion motor K302, a wok working position detection device K303, a feeding device working position conversion motor K304, a feeding device station detection device K305, an electric part, a circuit part, a power supply, a transmission line and a pipeline part.

Figure 24:
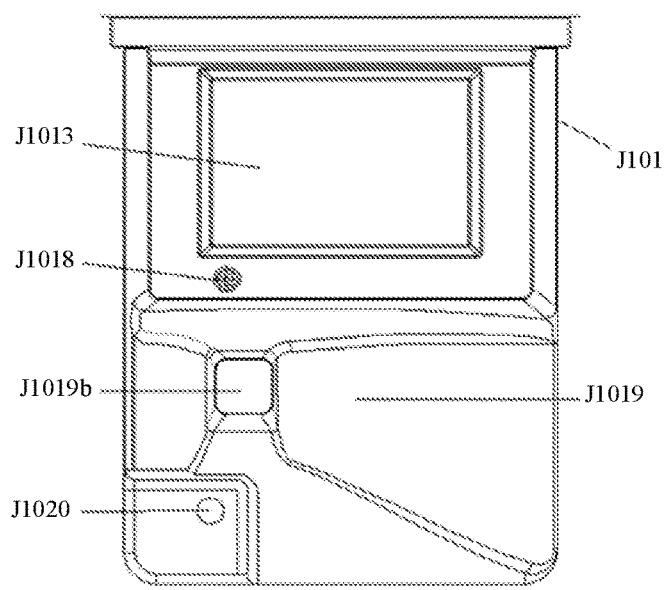
FIG. 24 is a bottom view of the inner shell of the tenth embodiment of the present invention.
Figure 25:
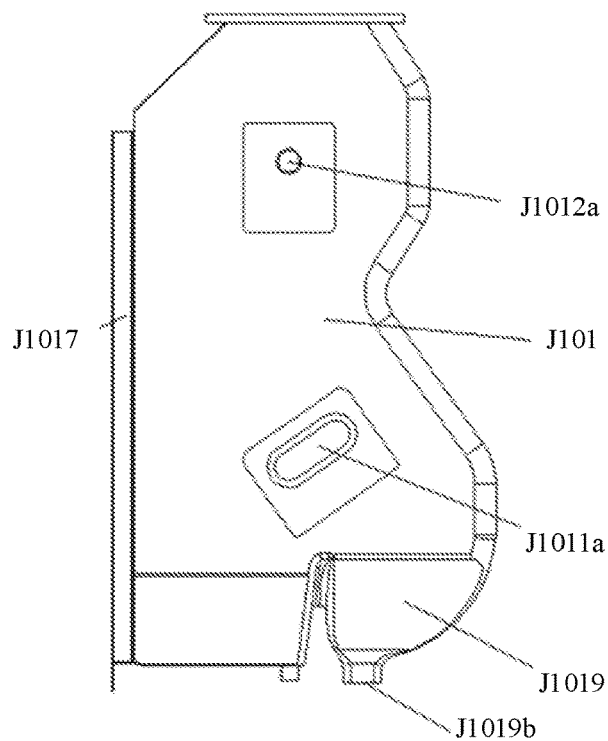
FIG. 25 is a side view of the inner shell of the tenth embodiment of the present invention.
Figure 26:
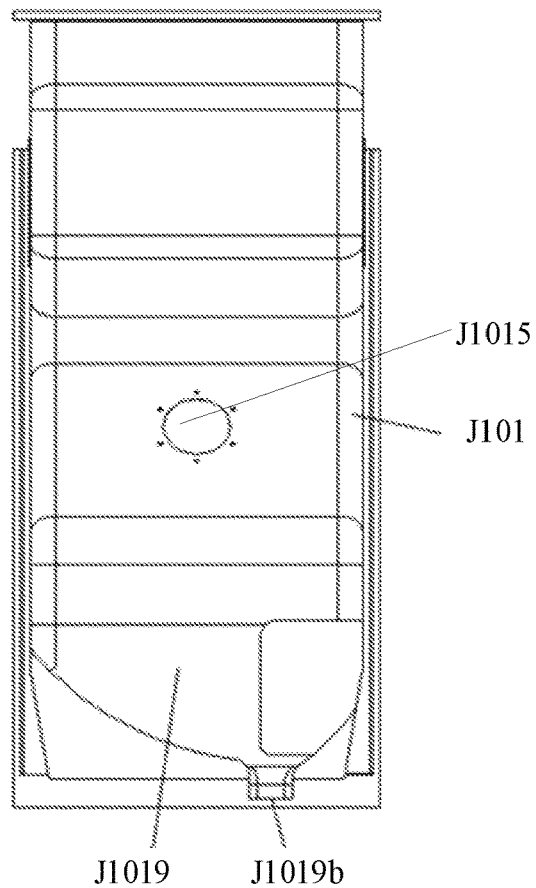
FIG. 26 is a rear view of the inner shell of the tenth embodiment of the present invention.
Figure 27:
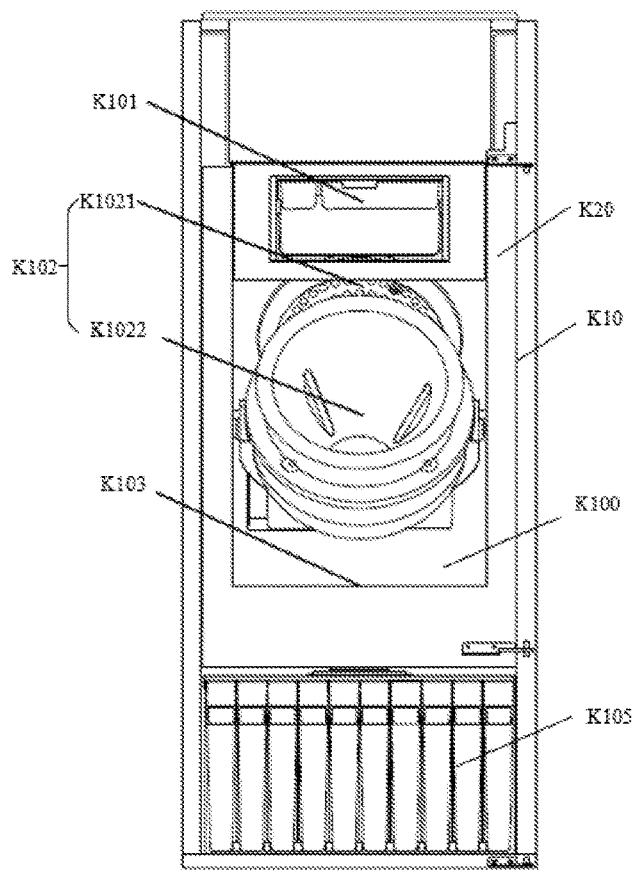
FIGS. 27-32 are structure schematic diagrams of the cooking machine and structure schematic diagrams of each function assembly provided by the eleventh embodiment of the invention.
Figure 28:
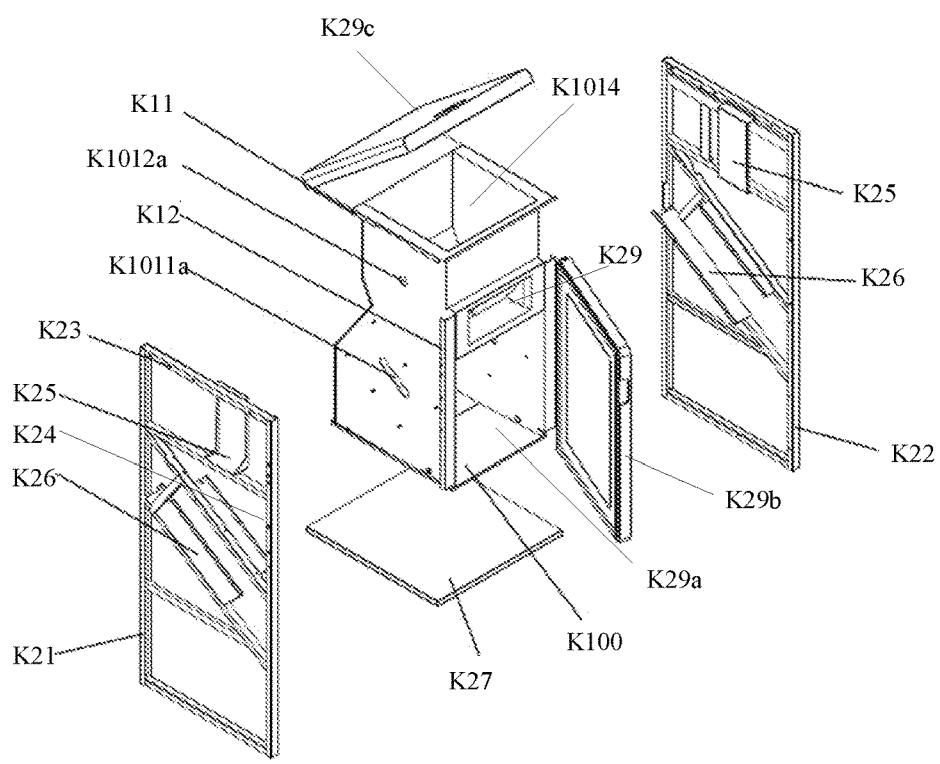
Figure 29:
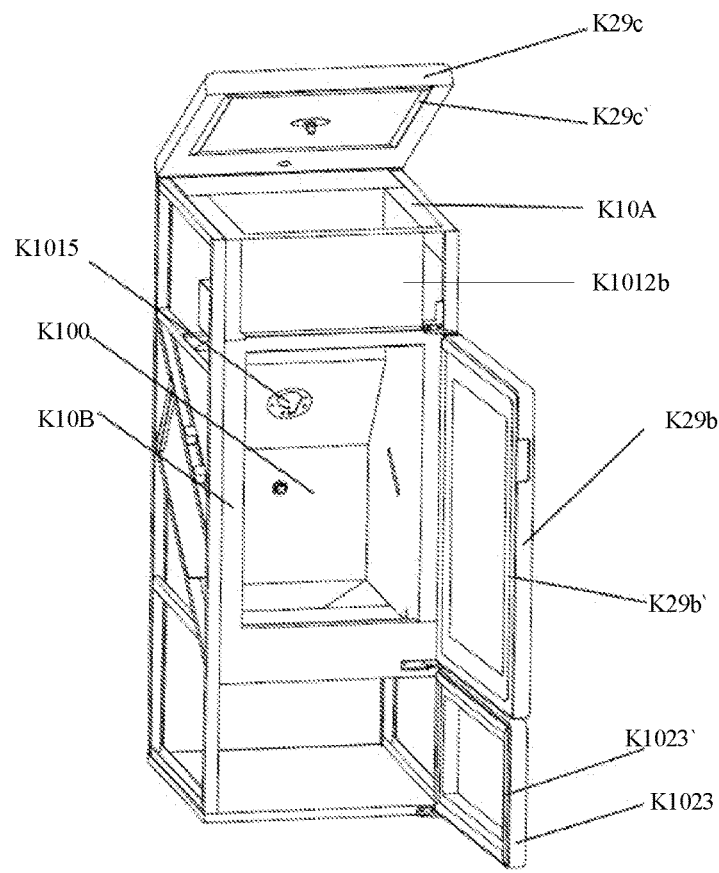
Figure 30:
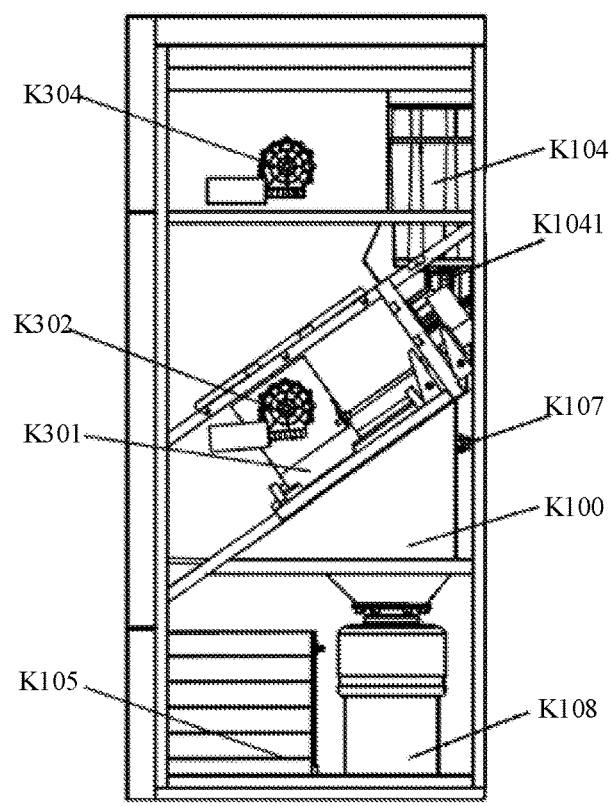
Figure 31:
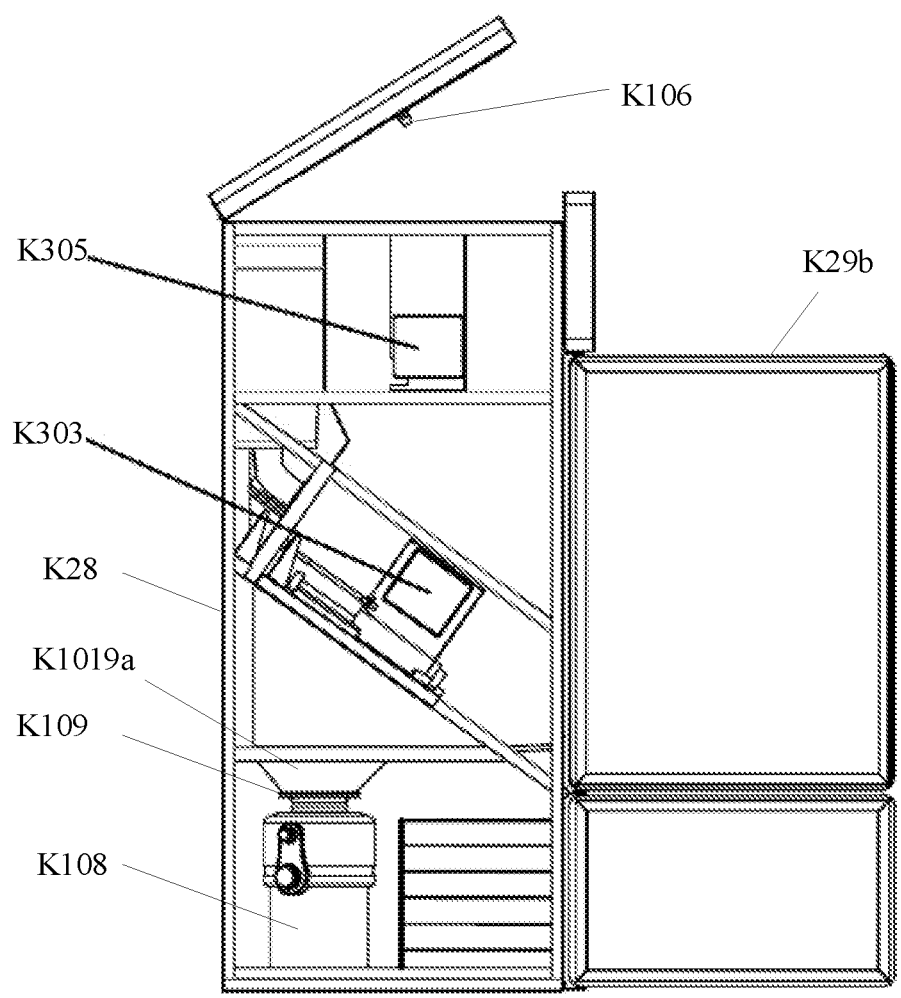
Figure 32:
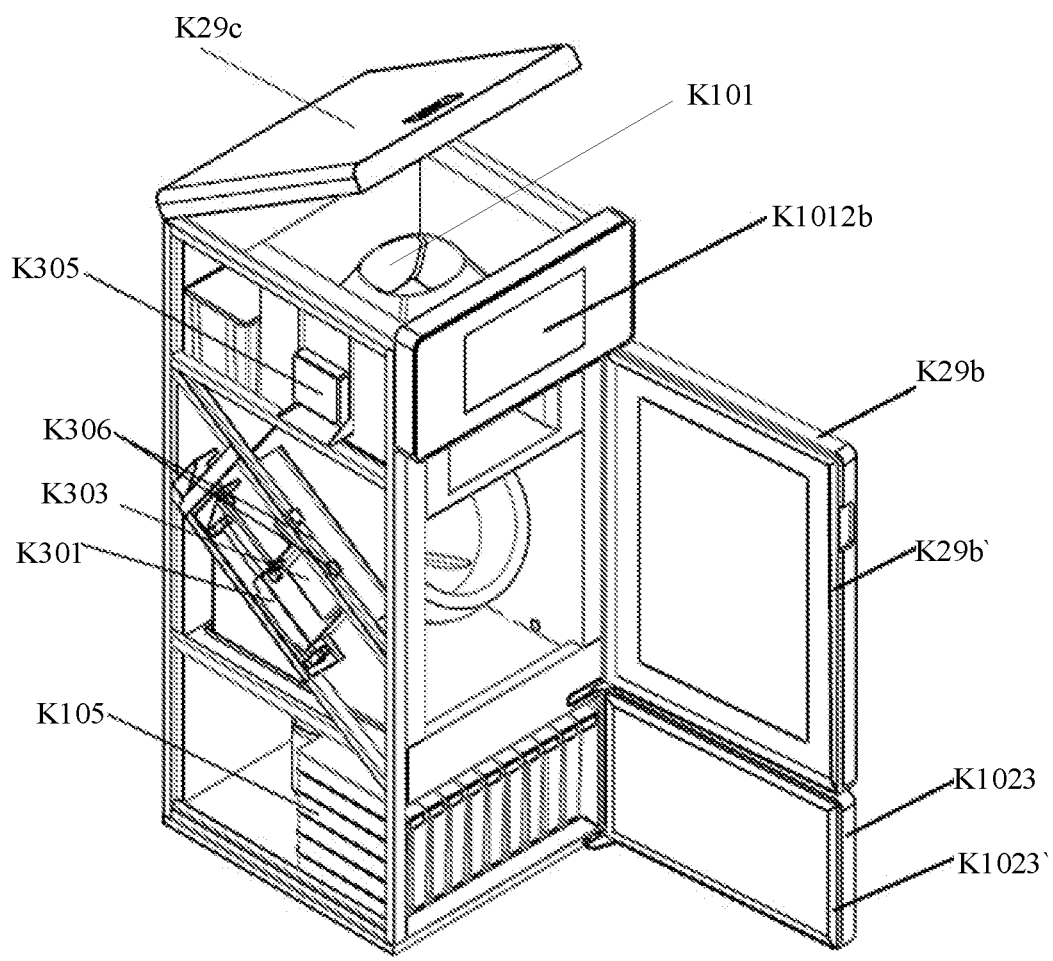

Referring to FIG. 24, the outer shell K20 includes a left frame K21 and a right frame K22, and the left frame K22 and the right frame K21 are connected to the inner shell K10 to secure the inner shell K10 inside the outer housing K20. Specifically, a connecting upper edge opening K11 is formed in each of the tops of the two side walls of the inner shell K10, and a first connecting hole position K23 correspondingly connected with the connecting upper edge opening K11 is formed in each of the tops of the left and right racks. A connecting front edge opening K12 is formed in each of the two sides, adjacent to the front end face, of the inner shell K10, and a second connecting hole position K24 corresponding to the connecting front edge opening K12 is formed in each of the side portions of the left and right racks. The inner shell K10 is fixed to the left rack K21 and the right rack K22 through the matched connection of the connecting upper edge opening K11 and the first connecting hole position K23 and the matched connection of the connecting front edge opening K12 and the second connecting hole position K24.

The left rack and the right rack are each provided with an ingredient feeding device installing position K25, and the ingredient feeding device installing positions K25 correspond to second installing positions K1012a which are arranged on the inner shell K10 and used for installing the ingredient feeding device K101 in the discharging area. The ingredient feeding device K101 arranged in a feeding area of the sealed cooking cavity K100 penetrates through a second installing position K1012a of the inner shell K10 and feeding device installing positions K25 on the left rack and the right rack by supports/rotating shafts and is connected with the feeding device working position conversion motor K304 and the feeding device working position detection device K305 which are arranged on the feeding device installing positions K25.

The left rack and the right rack are each provided with a cooking equipment installing position K26, and the cooking equipment installing positions K26 correspond to the first installing positions K1011a, used for installing the cooking equipment K102 in the cooking area, on the inner shell K10.

Cooking equipment K102 arranged in a cooking area of the sealed cooking cavity K100 penetrates through a first installing position K1011a of the inner shell K10 and the cooking equipment installing position K26 by a support/rotating shaft and is connected with a wok working position conversion motor K302 and a wok working position detection device K303 which are arranged on the cooking equipment installing position K26. Besides, the cooking equipment installing positions K26 on the left rack and the right rack are further used for installing and fixing a wok lifting device K301 used for controlling the wok to do directional movement in the cooking area, and installing positions used for arranging wok lifting limiting sensors K306 are further arranged close to one of the cooking equipment installing positions K26.

The outer shell K20 further comprises a bottom plate K27, a left side wall, a right side wall (not shown) and a rear plate K28 which are fixedly connected with the left rack and the right rack respectively. The outer shell K20 further comprises a middle door plate K29b used for opening and closing an ingredient container guiding opening K29 and a dish discharging outlet K29a of the inner shell K10, a top cover door plate K29c used for opening and closing a top cover opening K1014 of the inner shell K10, and a seasoning door plate K1023 used for opening and closing a seasoning adding area which is formed between the inner shell K10 and the bottom plate K27 and used for containing the seasoning device K105.

A first sealing strip K29c' is arranged at the contact position of the top cover door plate K29c and the top end face K10A of the inner shell K10, a second sealing strip and a third sealing strip are respectively arranged at the contact position of the middle door plate K29b and the front end face of the inner shell K10 and the contact position of the seasoning door plate K1023 and the front end face of the inner shell K10, so that sealing is achieved, and the sealing performance in the cooking cavity is guaranteed.

It can be understood that the middle door plate K29b and the seasoning door plate K1023 can be integrally formed. In addition, a third installing position K1012b is arranged on the top portion of the front end face K10B of the inner shell K10 and used for installing a human-machine control panel, and therefore a user can operate the human-machine control panel conveniently.

Besides, a spraying assembly capable of washing main cooking equipment is further arranged in the sealed cooking cavity K100 of the cooking machine and comprises a feeding device spraying piece K106 which is arranged at the top portion of the cooking cavity and used for directly washing the ingredient feeding device and a the wok spraying piece K107 which is arranged at the side portion or the bottom portion of the sealed cooking cavity K100 and is used for directly washing the interior of the wok.

The cooking fume treatment device K104 is arranged between the outer shell K20 and the inner shell K10 and located on the top portion of the rear end face of the inner shell K10. The cooking fume treatment device K104 is communicated with the interior of the cooking equipment (specifically communicated with the wok, and a cooking fume outlet K1015 is formed in the position, where the wok lid is arranged, of the inner shell K10) and connected with the sealed cooking cavity K100 through a cooking fume pipeline K1041. The cooking fume in the sealed cooking cavity K100 and the wok enters the cooking fume treatment device K104 from the cooking fume outlet so as to be purified. It can be understood that the inner shell K10 can also be provided with a cooking fume outlet (not shown) connected with the cooking fume treatment device K104 at other positions so that cooking fume in the sealed cooking cavity K100 can be directly discharged to the cooking fume treatment device K104 from the cooking fume outlet for cooking fume treatment. Besides, a cooking fume outlet of the cooking fume treatment device K104 can also be arranged to be communicated with the interior of the sealed cooking cavity K100, so that cooking fume treated by the cooking fume treatment device K104 is returned to the sealed cooking cavity K100 again to be circularly treated, and zero emission of cooking fume is achieved. The specific structure and treatment process that may be employed by the cooking fume treatment device K104 may refer to the relevant description of the embodiments described above.

The seasoning device K105 is arranged in the outer shell K20, located below the inner shell K10 and away from a sewage collecting opening K1019a of the inner shell K10, the sewage collecting opening K1019a is connected with a garbage processor K108, the seasoning device K105 comprises seasoning bottles (not shown), and each seasoning bottle is communicated with the wok in the sealed cooking cavity via a seasoning pipe and a seasoning pump, and specifically, is communicated with the seasoning adding opening of the wok lid. The seasoning device K105 adds seasoning into the wok via the seasoning pump, the seasoning pipe connecting with the seasoning bottle and an adding channel in the wok lid, and the seasoning can be added in the whole cooking process. The garbage treater K108 is arranged below the inner shell K10 and is in sealed connection with the sewage collecting port K1019a in the bottom portion of the inner shell K10 through a garbage treater connecting piece K109.

Compared with the prior art, the cooking machine has the advantages that the outer shell K20 and the inner shell K10 are assembled, so that the space formed by the inner shell K10 forms the sealed cooking cavity, and the ingredient feeding device K101, the cooking equipment K102 and the dish discharging device K103 are arranged in the sealed cooking cavity; auxiliary cooking equipment (the wok lifting device K301, the wok working position conversion motor K302, the wok working position detection device K303, the feeding device working position conversion motor K304, the feeding device working position detection device K305, the electrical part, the circuit part, the power supply, the transmission line part and pipeline part) and the cooking fume treatment device are arranged outside the sealed cooking cavity; therefore, cooking fume generated by the cooking equipment can be discharged into the environment only after being discharged into the cooking fume treatment device through the cooking fume outlet in the inner shell to be treated, and the influence of cooking fume of the cooking machine on the environment is effectively prevented; besides, the auxiliary cooking equipment is prevented from being affected by the high-temperature, high-humidity and high-pH environment of the cooking area of the cooking machine, it is guaranteed that the feeding device, the cooking equipment, the seasoning device and the like work durably and effectively, and the safety of cooked food is guaranteed.

It can be understood that the cooking machine provided by the embodiment of the invention can adopt the cooking fume treatment system for cooking machines provided by any embodiment of the invention to realize a cooking fume treatment function.

In the description of the present invention, it is to be understood that the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise", and the like, indicate orientations or positional relationships based on those shown in the drawings, merely for convenience of description and simplification of the description, and do not indicate or imply that the device or element referred to must have a particular orientation, be constructed in a particular orientation, and be operated, and thus, are not to be construed as limiting the present invention.

Furthermore, the terms "first", "second" are used for descriptive purposes only and are not to be construed as indicating or implying relative importance or to implicitly indicate the number of technical features indicated. Thus, a feature defined as "first" or "second" may explicitly or implicitly include one or more of that features. In the description of the present invention, "a plurality" means at least two, e.g., two, three, etc., unless explicitly specified otherwise.

In the present invention, unless expressly specified and limited otherwise, the terms "mounted", "jointed", "connected", "fixed" and the like are to be construed broadly, e.g., as being permanently connected, detachably connected, or integral; may be mechanically, electrically or otherwise in communication with each other; they may be directly connected or indirectly connected through intervening media, or may be connected through the use of two elements or the interaction of two elements. The specific meanings of the above terms in the present invention can be understood according to specific situations by those of ordinary skill in the art.

The foregoing is a preferred embodiment of the present invention, and it should be noted that several improvements and modifications may also be made to those of ordinary skill in the art without departing from the principles of the present invention, which are also considered to be within the scope of the present invention.

What is claimed is:

1. A cooking fume treatment system for cooking machines, comprising a sealed cooking cavity, cooking equipment and a first cooking fume treatment device; the cooking equipment is arranged in the sealed cooking cavity; the first cooking fume treatment device is provided with a first cooking fume inlet and a first cooking fume outlet, the first cooking fume inlet is communicated with the cooking equipment, and the first cooking fume outlet is communicated with external of the sealed cooking cavity or communicated with the sealed cooking cavity;

wherein the cooking equipment comprises a wok and a wok lid adapted for closing or opening the wok; the wok lid is provided with an air outlet hole, and the first cooking fume inlet is connected with the air outlet hole in a sealed manner so as to be communicated with the cooking equipment.

2. The cooking fume treatment system for cooking machines according to claim 1, wherein the first cooking fume treatment device further comprises a second cooking fume inlet, and the second cooking fume inlet is communicated with the sealed cooking cavity.

3. The cooking fume treatment system for cooking machines according to claim 1, further comprising a second cooking fume treatment device, a third cooking fume inlet and a second cooking fume outlet are formed in the second cooking fume treatment device, the third cooking fume inlet communicates with the sealed cooking cavity, and the second cooking fume outlet communicates with the external of the sealed cooking cavity.

4. The cooking fume treatment system for cooking machines according to claim 1, wherein the cooking equipment further comprises a wok heating device adapted for bearing and heating the wok and a wok rotating device adapted for controlling the wok to rotate.

5. The cooking fume treatment system for cooking machines according to claim 1, wherein the first cooking fume treatment device comprises a fume guiding pipe, a condensing pipe, a condensate collector and a pipeline fan; an air inlet end of the fume guiding pipe is communicated with the air outlet hole of the wok lid, an air outlet end of the fume guiding pipe is communicated with the pipeline fan through the condensing pipe, and the pipeline fan is arranged at the first cooking fume outlet; pipe sections of the condensing pipe are extended in vertical direction, and the condensate collector is arranged below the condensing pipe and communicated with a lowest part of the condensing pipe.

6. The cooking fume treatment system for cooking machines according to claim 3, wherein the second cooking fume treatment device comprises a cooking fume filter and a fan; an air inlet of the fan is provided as the third cooking fume inlet to be communicated with a cooking area, an air outlet of the fan is communicated with an air inlet of the cooking fume filter, and an air outlet of the cooking fume filter is provided as the second cooking fume outlet.

7. The cooking fume treatment system for cooking machines according to claim 1, wherein the first cooking fume treatment device comprises:
- a box body provided with a cooking fume channel formed therein, and an inlet and an outlet of the cooking fume channel are communicated with the first cooking fume inlet and the first cooking fume outlet respectively;
- a fan adapted for sucking cooking fume into the box body from the inlet of the cooking fume channel and exhausting the cooking fume out from the outlet of the cooking fume channel; and
- a cooking fume filtering assembly arranged in the cooking fume channel.

8. The cooking fume treatment system for cooking machines according to claim 7, wherein the box body is further provided with a water adding opening, and the first cooking fume treatment device further comprises:
- a water circulating pipeline provided with at least one first water outlet which is formed in a top portion of the box body and located above the cooking fume channel and at least one first water inlet which is formed in a lower portion of the box body; and
- a water pump arranged in the water circulating pipeline.

9. The cooking fume treatment system for cooking machines according to claim 8, wherein the first cooking fume treatment device further comprises a spraying plate provided with a plurality of spraying holes, the spraying plate is arranged between and separate the cooking fume channel and the top portion of the box body, and the at least one first water outlet is located above the spraying plate; water sprayed from each first water outlet falls onto the spraying plate and then passes through the plurality of spraying holes of the spraying plate to spray the cooking fume channel.

10. The cooking fume treatment system for cooking machines according to claim 9, wherein the first cooking fume treatment device further comprises a cooling body of a hollow structure, the cooling body is provided with a second water inlet which is communicated with a water outlet pipe section of the water circulating pipeline and a second water outlet which is located above the spraying plate; water in the water outlet pipe section of the water circulating pipeline flows into the cooling body from the second water inlet to be cooled, then is sprayed onto the spraying plate from the second water outlet, and then is sprayed to the cooking fume channel from the plurality of spraying holes of the spraying plate.

11. The cooking fume treatment system for cooking machines according to claim 10, wherein the first cooking fume treatment device further comprises a cooking fume inlet pipe and a spraying cavity with an opening in a top portion thereof;
- the top portion of the spraying cavity is fixed to a bottom portion of a part, provided with the spraying holes, of the spraying plate, and a bottom portion of the spraying cavity is located above a bottom portion of the box body and provided with a through opening;
- one end of the cooking fume inlet pipe penetrates through the inlet of the cooking fume channel in a sealed manner in a direction towards an interior of the box body and penetrates into the spraying cavity in a sealed manner; in the spraying cavity, an extended cooking fume spraying channel is formed between one end of the cooking fume inlet pipe and the through hole; at least one cooking fume filtering layer is arranged in the cooking fume spraying channel, and a bottom portion of each section of the cooking fume spraying channel communicates with the through opening.

12. The cooking fume treatment system for cooking machines according to claim 10, wherein the first cooking fume treatment device further comprises a miniature refrigerator provided with a refrigeration part arranged in the cooking fume channel; the cooling body is in contact with a heat conduction part of the miniature refrigerator, cold water flowing into the cooling body takes away heat of the heat conduction part;
- a heat dissipation opening is formed in the top portion of the box body, a containing cavity communicated with the heat dissipation opening is formed above the spraying plate, the heat conduction part of the miniature refrigerator and the cooling body are both arranged in the containing cavity, heat generated by the heat conduction part of the miniature refrigerator is discharged out from the heat dissipation opening.

13. The cooking fume treatment system for cooking machines according to claim 11, further comprising a semiconductor refrigerator provided with a plurality of refrigeration pieces, and the plurality of refrigeration pieces of the semiconductor refrigerator are arranged in the spraying cavity and distributed above the cooking fume spraying channel.

14. The cooking fume treatment system for cooking machines according to claim 11, wherein the first cooking fume treatment device further comprises:
- a first longitudinal partition plate longitudinally arranged between the spraying plate and the bottom portion of the box body, and a cooking fume channel opening is formed between a bottom portion of the first longitudinal partition plate and the bottom portion of the box body;
- a transverse partition plate located between the spraying plate and the bottom portion of the box body and transversely arranged between the first longitudinal partition plate and a side wall, opposite to the first longitudinal partition plate, of the box body;
- a second longitudinal partition plate longitudinally arranged between the first longitudinal partition plate and the side wall of the box body, a top portion of the second longitudinal partition plate is in sealed connection with the bottom portion of the spraying plate, and a bottom portion of the second longitudinal partition plate is spaced from a top portion of the transverse partition plate; and
- a third longitudinal partition plate longitudinally arranged between the second longitudinal partition plate and the side wall of the box body, a top portion of the third longitudinal partition plate is spaced from the bottom portion of the spraying plate, a bottom portion of the third longitudinal partition plate is fixed to the top portion of the transverse partition plate, and a gap is formed between the bottom portion of the third longitudinal partition plate and the transverse partition plate;
- an other end of the cooking fume inlet pipe is located between the first longitudinal partition plate and the second longitudinal partition plate; the through opening is formed in the transverse partition plate and located between the third longitudinal partition plate and the side wall of the box body; the outlet of the cooking fume channel is formed in the other side wall, opposite to the side wall, of the box body and located below the spraying plate.

15. The cooking fume treatment system for cooking machines according to claim 7, wherein the first cooking fume treatment device further comprises a first filtering box provided with a cooking fume inlet and a cooking fume outlet, and at least one cooking fume filter layer is arranged between the cooking fume inlet and the cooking fume outlet; the outlet of the cooking fume channel is communicated with the first cooking fume outlet through the first filtering box, the outlet of the cooking fume channel is communicated with the cooking fume inlet of the first filtering box, and the cooking fume outlet of the first filtering box is communicated with the first cooking fume outlet.

16. The cooking fume treatment system for cooking machines according to claim 15, wherein the box body is provided with a water adding opening formed in a top portion thereof and a water draining opening formed in a bottom portion thereof; water is added into the box body from the water adding opening to spray the cooking fume filtering assembly in the cooking fume channel to cool and clean the cooking fume filtering assembly; and water which is added into the box body and sprays the cooking fume filtering assembly is discharged from the water draining opening of the box body.

17. The cooking fume treatment system for cooking machines according to claim 16, wherein the first cooking fume treatment device further comprises a draining pipe; the first filtering box is located below the box body; the cooking fume inlet is formed in the top portion of the first filtering box, and the cooking fume outlet is formed in the bottom portion of the first filtering box; one end of the draining pipe is connected with the top portion of the first filtering box, and an other end of the draining pipe penetrates into and protrudes relative to the bottom portion of the box body; when a water level at the bottom portion of the box body is higher than a preset height of the other end of the draining pipe, the water in the box body flows down into the first filtering box through the draining pipe, and sequentially passes through each cooking fume filter layer in the first filtering box from top to bottom to cool and/or clean each cooking fume filter layer, the water flowing into the first filtering box is discharged from the cooking fume outlet formed in the bottom portion of the first filtering box.

18. The cooking fume treatment system for cooking machines according to claim 15, wherein the first cooking fume treatment device further comprises a cooking fume outlet pipe and a second filtering box; the outlet of the cooking fume channel is communicated with the cooking fume inlet of the first filtering box via the second filtering box, an inlet of the second filtering box is communicated with the outlet of the cooking fume channel via the fan, and an outlet of the second filtering box is communicated with the cooking fume inlet of the first filtering box via the cooking fume outlet pipe; and at least one cooking fume filtering layer is arranged in the second filtering box.

19. A cooking machine, comprising the cooking fume treatment system for cooking machines according to claim 1.

* * * * *